United States Patent
Wetzel et al.

(10) Patent No.: US 7,264,648 B1
(45) Date of Patent: Sep. 4, 2007

(54) REMOVING SILOXANES FROM A GAS USING A SEGMENTED FILTRATION SYSTEM CUSTOMIZED TO THE GAS COMPOSITION

(75) Inventors: Jeffrey V. Wetzel, Lake Stevens, WA (US); Paul M. Tower, Snohomish, WA (US)

(73) Assignee: Applied Filter Technology, Inc., Snohomish, WA (US)

( * ) Notice: Subject to any disclaimer, the term of this patent is extended or adjusted under 35 U.S.C. 154(b) by 412 days.

(21) Appl. No.: 10/871,920

(22) Filed: Jun. 18, 2004

Related U.S. Application Data

(60) Provisional application No. 60/479,592, filed on Jun. 19, 2003.

(51) Int. Cl.
*B01D 53/02* (2006.01)

(52) U.S. Cl. ............... 95/8; 95/11; 95/141; 95/147; 95/148; 95/901; 95/903; 96/111; 96/121; 96/131; 96/143; 96/146; 96/154

(58) Field of Classification Search ............ 95/1, 95/8, 11, 90, 141, 143, 147, 148, 901, 903; 96/108, 111, 121, 131, 143, 146, 154
See application file for complete search history.

(56) References Cited

U.S. PATENT DOCUMENTS

| | | | | |
|---|---|---|---|---|
| 4,138,506 | A * | 2/1979 | Eida et al. | 210/916 |
| 5,726,118 | A * | 3/1998 | Ivey et al. | 502/417 |
| 7,008,470 | B2 * | 3/2006 | Makino et al. | 96/131 |
| 7,008,471 | B2 * | 3/2006 | Koyama et al. | 96/131 |
| 2001/0009125 | A1 * | 7/2001 | Monereau et al. | 96/131 |

OTHER PUBLICATIONS

Liang, Kit Y., P.E. et al., Pirnie, Malcolm, "Removing Siloxanes: Solution to Combustion Equipment Problems", Paper presented at WEFTEC02 by Malcolm Pirnie Engineers and Bergen County Utility Authority, New Jersey, Oct. 2002.*

Gary, Daniel et al., "Research Project to Remove Siloxanes from Digester Gas", Paper presented at the California Water Pollution Controls Conference in Palm Springs, CA, Apr. 2001.*

Tower, Paul, "*Removal of Siloxanes from Landfill Gas by SAG™ Polymorphous Porous Graphite Treatment Systems*" Paper presented at SWANA 26th Landfill Gas Symposium Mar. 27, 2003.

(Continued)

*Primary Examiner*—Jason M. Greene
(74) *Attorney, Agent, or Firm*—Ronald M. Anderson

(57) ABSTRACT

A plurality of different layers of filter media are used to remove siloxanes from a gas stream. Based on an analysis of the specific gas stream to be filtered, a filter media having an average pore size enabling the preferential removal of a specific class of contaminants is selected for each different class of contaminants. The layers are arranged in sequential order such that contaminants having a higher molecular weight are preferentially removed by the first layers. Collectively, the layers define a segmented activity gradient that enables each class of contaminants present in the gas stream to be preferentially removed in a different layer, preventing removal competition between different classes of contaminants. A polymorphous graphite is used as the filter media, because that material is available in a range of well-controlled pore sizes, as opposed to conventional activated carbon filter media, which generally exhibits poorly-controlled pore sizes.

27 Claims, 11 Drawing Sheets

OTHER PUBLICATIONS

Press Release Malcolm Pirnie, Engineers, wins "Best New Environmental Technology, Category E" ACEC 2003 Engineering Excellence Awards for SAG™ System installed at BCUA, Little Ferry, NJ, Jan. 10, 2003.

Liang, Kit Y., P.E., Ramon, Li, P.E., Pirnie, Malcolm, *"Removing Siloxanes: Solution to Combustion Equipment Problems"* Paper presented at WEFTEC02 by Malcolm Pirnie Engineers and Bergen County Utility Authority, New Jersey, Oct. 2002.

Glus, Peter H., Liang, Kit Y., P.E., Ramon, Li, P.E., Pope, Richard J., P.E., *"Recent Advances in the Removal of Volatile Methylsiloxanes from Biogas at Sewage Treatment Plants and Landfills"* Paper presented at the Annual Air and Waste Management (AWMA) 2001 Conference in Orlando, Florida. http://www.appliedfiltertechnology.com/page1252.asp.

Gary, Daniel, Acosta, Glenn, Kilgore, John, Min, Seong, Adams, Greg, Lost Angeles County Sanitation Districts Research Project to Remove Siloxanes from Digester Gas Paper presented at the California Water Pollution Controls Conference in Palm Springs, CA, Apr. 2001 http://www.appliedfiltertechnology.com/page1253.asp.

Applied Filter Technology, *"Fuel Cells Thrive on Clean Gas"* Chemical Engineering, Jul. 2000, http://www.appliedfiltertechnology.com/page1254.asp.

Applied Filter Technology, *"Innovative Retrofit Saves Energy,"* Tax Dollars Water World, Jan. 2000. http://www.appliedfiltertechnology.com/page1255.asp.

Glus, Peter H., Liang, Kit Y., P.E., Ramon, Li, P.E., Pope, Richard J., P.E., *"Only Three Methods to Control VMSs at Full Scale"* Scrubber Adsorber Newsletter, Feb. 2000. http://www.appliedfiltertechnology.com/page1256.asp.

Liang, Kit Y., P.E., Ramon, Li, P.E., Tudman, Scott, Schneider, Robert, J., P.E., Sheehan, Jerome F., P.E., Anderson, Eric, P.E., Pilot Testing Case Study: Pilot Testing Case Study: *"Removal of Volatile Methylsiloxanes from Anaerobic Digester Gas Fired Engines"* Paper No. 960. Paper presented at the Anuual Air and Waste Management (AWMA) 1999 Conference in St. Louis, Missouri http://www.appliedfiltertechnology.com/page1257.asp.

Tower, Paul, Principal Applied Filter Technology. "New Technology For Removal Of Siloxanes in Digester Gas Results in Lower Maintenance Costs and Air Quality Benefits In Power Generation Equipment." WEFTEC [03] 78th *Annual Technical Exhibition and Conference.* Oct. 11-15, 2003. 9pp.

\* cited by examiner

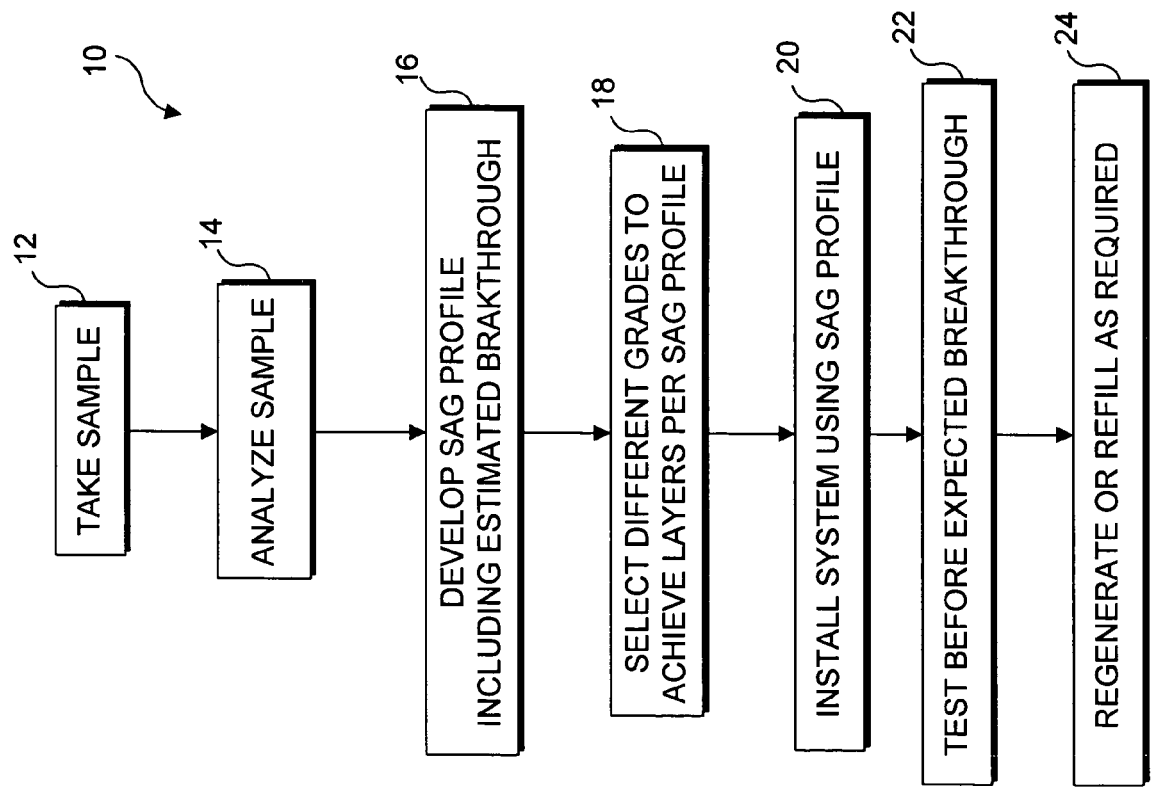

US 7,264,648 B1

REMOVING SILOXANES FROM A GAS USING A SEGMENTED FILTRATION SYSTEM CUSTOMIZED TO THE GAS COMPOSITION

RELATED APPLICATIONS

This application is based on prior now abandoned provisional application Ser. No. 60/479,592, filed on Jun. 19, 2003, the benefit of the filing date of which is hereby claimed under 35 U.S.C. § 119(e).

FIELD OF THE INVENTION

The present invention generally relates to removing trace siloxane contaminants from a gas stream, and more specifically, to employing a filtration system including a plurality of filter beds customized to a gas stream composition, wherein the plurality of filter beds remove the siloxanes both by adsorption and by acting as a molecular sieve.

BACKGROUND OF THE INVENTION

Siloxanes are a chemically stable manufactured additive (produced by Dow Corning Co. and others) used in many consumer and industrial products, ranging from cosmetics and adhesives, to microchip manufacturing. Siloxanes can enhance product flow capability, texture, adhesion, uniformity, and flavor. In consumer products, they are used as a volatile dispersant agent for other organic chemical additives.

Siloxanes comprise carbon (C), Hydrogen (H), Oxygen (O) and Silicon (Si). Most siloxanes volatilize rapidly in many manufacturing and anaerobic digestion processes. Such siloxanes are known as volatile methyl siloxanes (VMS) and can be linear molecule or rings, (cyclomethicones), and include alternating Si and O atoms. In cyclical VMS, each Si atom has two methyl-groups ($CH_3$) attached to it. Some of the more common siloxanes include the linear hexamethyldisiloxane ("MM"), and octamethyltrisiloxane ("MDM"). Some of the more common cyclical siloxanes are hexamethylcycloclotrisiloxane (referred to as "D3"), octamethylcyclotetrasiloxane (referred to as "D4") decamethylcyclopentasiloxane (referred to as "D5"), and Dodecamethylcyclohexasiloxane (referred to as "D6"). "D" is used to represent the repeated dimethyl-silicon-oxygen group in a ring structure and is followed by either an ordinal or a subscript indicating the number of D groups that are present.

Although siloxanes are stable and non toxic, their presence in a gas stream is often undesirable. Siloxanes will be carried throughout the treatment facility as a constituent of the methane gas, and under certain temperature and pressure conditions, the siloxanes will cause undesirable silica deposits to form in process-related equipment. For example, siloxanes are known to be present in trace amounts in biogas produced in Waste Water Treatment Plants (WWTP) and landfills. Such biogas is often used as an alternate fuel to run engines that power equipment or produce electrical power. When the biogas is burned as a fuel, the siloxanes cause silica deposits to form in the engines, and such deposits can significantly increase maintenance costs. The silica deposits form on hot engine components, such as cylinder heads. Silica particles also become entrained in the engine oil, increasing wear on bearings. The result of silica being introduced into internal combustion engines is a significant increase in engine wear, causing more frequent engine rebuilding and concomitant downtime.

In electrical power generation employing emission catalysts, siloxanes can form a silica film on the catalyst surface, rapidly and significantly reducing the catalyst's activity. This form of damage to these expensive catalysts is irreversible, and they must be replaced.

Siloxanes can also be unintentionally introduced in an industrial process. For example, siloxanes are formed during electronic microchip manufacturing and contaminate process gas streams (such as silane), which are used in production of related components. These siloxanes increase the rejection rate of manufactured silicon wafers. In industrial emission control processes, silica deposits (as noted above) can foul solvent recovery equipment and thermal oxidation equipment.

Siloxanes are also often present in gas distribution environments, where methane and/or natural gas is compressed and injected into pipelines for distribution. Siloxanes are sometimes added to compressor oils to increase lubricity and to the pipelines themselves during pigging operations. When the siloxane contaminated gas is combusted as a fuel (such as for heat), silica deposits foul the combustion equipment in a manner similar to the fouling of internal combustion engines described above.

Siloxanes have been found to cause problems such as those noted above when present in concentrations as low as 50 ppbv (parts per billion by volume), which is at or near the state-of-the-art detection limit for most siloxanes. Siloxanes are damaging at such low levels because the negative impact of silica deposition is cumulative. Homogeneous activated carbon filters have been successfully employed to remove some siloxanes; however, the performance of such filters in removing siloxanes from a gas stream is inadequate, clearly leaving room for improvement. Accordingly, it would be desirable to provide a better method and apparatus to effectively remove siloxanes from a gas stream.

As noted above, biogas often includes one of more constituents that complicate the removal of siloxanes from the gas, or whose presence is also undesirable. For example, halogenated organic species (such as chlorinated solvents and chlorofluorocarbons) are also found in biogas. When these halogenated species are burned along with the methane in internal combustion engines, hydrochloric acid is formed, which causes increased corrosion of metal parts. Halogenated species are also poisons to emission catalysts used to control nitrogen oxides (NOx) and carbon monoxide. The presence of heavy organics (such as benzene, toluene, and xylene) in sufficiently high concentrations can adversely affect the removal of siloxanes and halogenated organics.

Clearly, it would be desirable to remove the chlorinated organics, and heavy organics, as well as the siloxanes, from gas streams. One prior art approach uses activated carbon for this purpose. While activated carbon can effectively remove all three of the offending species, breakthrough of these species can occur rapidly, whereupon the media must be replaced. Moreover, the capacity for typical activated carbon comprising bituminous coal-based carbons, coconut shell carbons, or wood-based carbons is limited, requiring their frequent replacement. It would therefore be desirable to provide a more effective system and method for removing siloxanes, chlorinated organics, and heavy organics from gas streams.

SUMMARY OF THE INVENTION

The present invention employs a filter bed including a plurality of different layers, to remove siloxanes from a gas stream. Each layer in the filter bed includes a carbon based filter material having a well defined average pore size. The grade of filter media in each layer is specifically selected so that the pore size associated with that grade preferentially removes a specific class of contaminants from the gas stream. The layers are arranged in sequential order such that contaminants having a higher molecular weight are preferentially removed by the first layers. Collectively, the layers define a segmented activity gradient that enables each class of contaminants present in the gas stream to be preferentially removed in a different layer, preventing removal competition between different classes of contaminants. A polymorphous graphite is used as the filter media, because that material is available in a range of well controlled pore sizes, as opposed to conventional activated carbon filter media, which generally exhibits a wide variety of pore sizes.

In one aspect of the invention, samples of available grades of polymorphous graphite are analyzed to determine the average pore size of each grade. A particularly preferred polymorphous graphite is produced from anthracite coal. Preferred filter media will have an average pore size such that at least 50% of the pores vary within a relatively narrow range, preferably varying plus or minus about 25 nm from an average value, and more preferably varying plus or minus about 5 nm from an average value, and most preferably varying plus or minus about 0.5 nm from an average value. Particularly for siloxane removal, the narrowest range is preferred.

A model is developed which correlates the pore sizes of available grades of filter media to classes of contaminants, based on the molecule weight of the contaminant. The model will enable a specific one of the different grades of filter media to be selected based on the molecular weight of the contaminant. Empirical data can be used to improve the model. A sample of the gas to be treated is taken, and the contaminants to be removed will be identified. For each different class of contaminant, a specific grade of filter media having a pore size expected to preferentially remove that class of contaminant will be identified. The concentration of the contaminant will determine the volume of the selected grade of filter media required. A multilayer filter bed is constructed using each different grade of filter media identified by the model, such that filter media selected to preferentially remove the larger sized contaminants is disposed closest to the gas inlet, while filter media selected to preferentially remove the smaller sized contaminants is disposed closest to the gas outlet.

Systems in accord with the present invention can include pre-treatment units, post-treatment units, and filter media regenerators. The use of microwave heaters represent a particularly preferred regeneration technique.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a flowchart which illustrates the overall sequence of steps utilized to design and implement a siloxane removal system in accord with the present invention;

FIG. 2A schematically illustrates a prior art homogenous filter bed in which a plurality of contaminants compete for removal in the filter bed;

FIG. 2B schematically illustrates a filter bed including three sub-gradient layers; each of which exhibits an average pore size specifically selected to favor the removal of a specific class of contaminants, and which collectively define a segmented activity gradient;

FIG. 3 is a block diagram schematically illustrating the elements present in a basic segmented activity gradient siloxane removal system in accord with the present invention;

FIG. 4A schematically illustrates a vertically oriented filter canister including a plurality of sub-gradient layers;

FIG. 4B schematically illustrates a horizontally oriented filter canister including a plurality of sub-gradient layers;

FIGS. 4C and 4D schematically illustrate a radially oriented filter canister including a plurality of sub-gradient layers, in which the gas to be filtered moves from an annular outer volume to an annular inner volume;

FIGS. 4E and 4F schematically illustrate a radially oriented filter canister including a plurality of sub-gradient layers, in which the gas to be filtered moves from an annular inner volume to an annular outer volume;

Figure 5A:
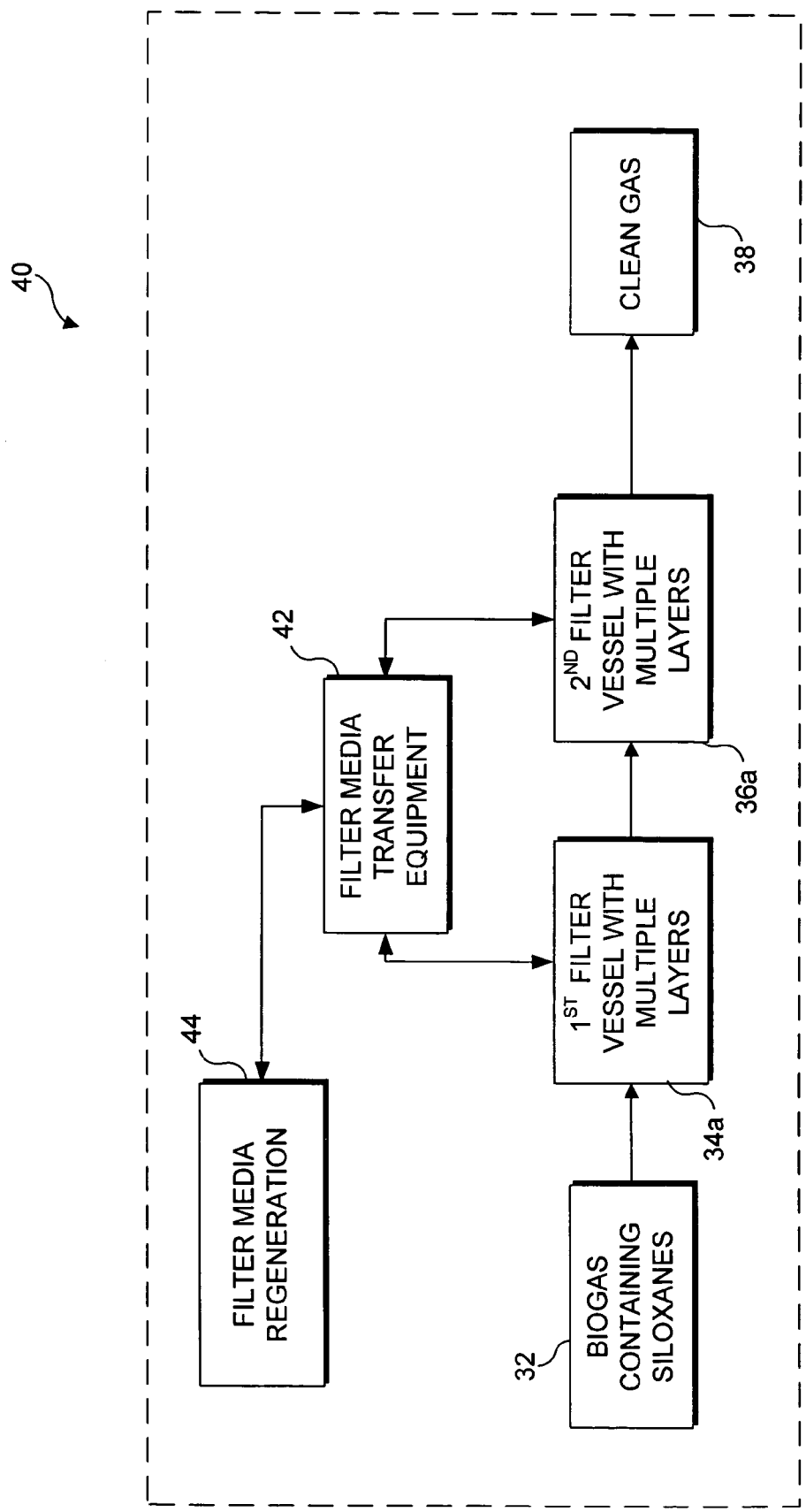
FIG. 5A is a block diagram schematically illustrating the elements present in a segmented activity gradient siloxane removal system which includes a filter media regeneration unit in accord with the present invention.
Figure 5B:
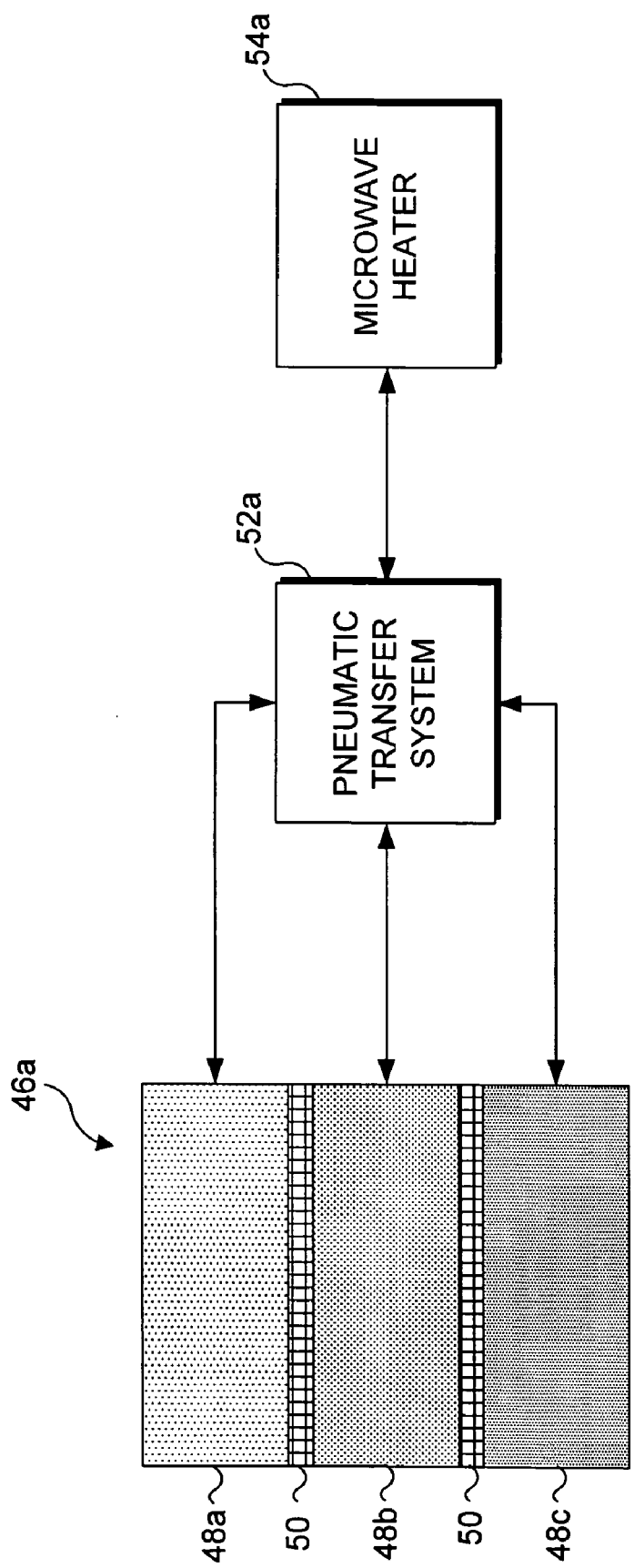
FIG. 5B is a block diagram of a pneumatic transfer system configured to transfer filter media from a filter canister to a microwave heater for regeneration in a batch process.
Figure 5C:
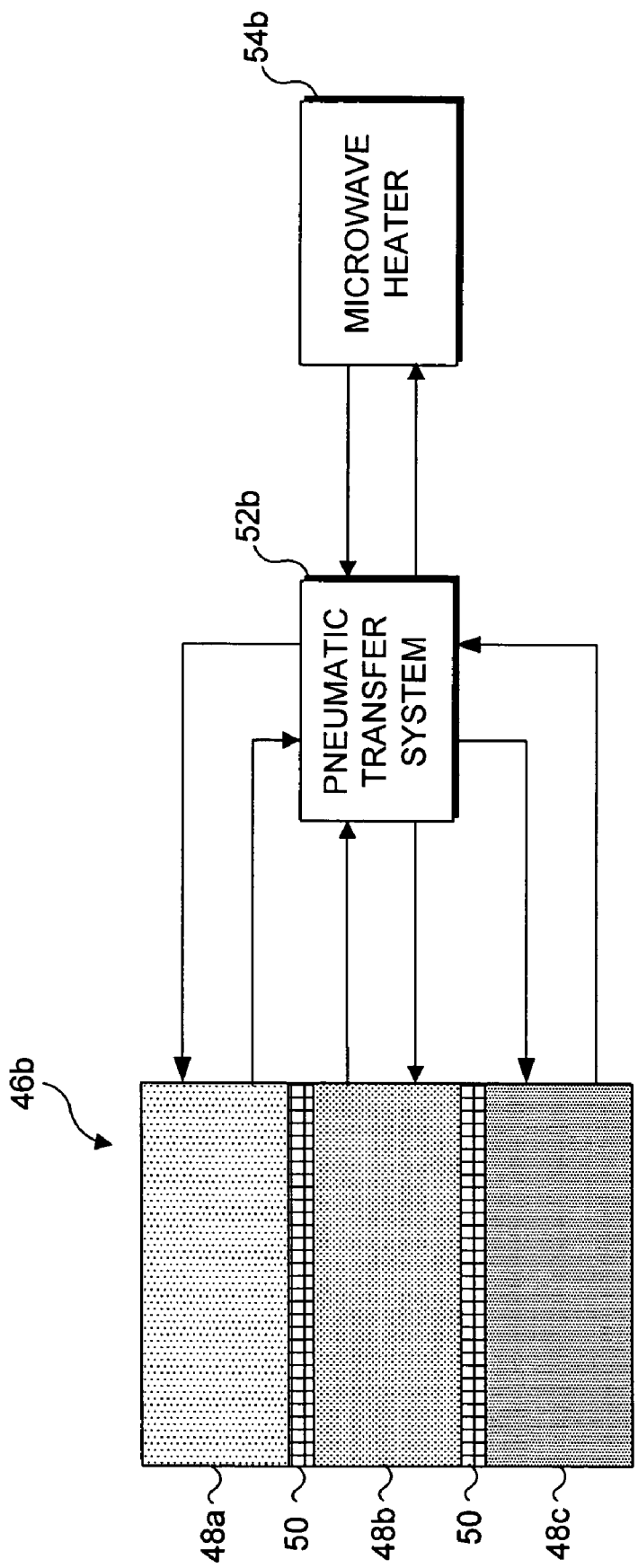
FIG. 5C is a block diagram of a pneumatic transfer system configured to transfer filter media from a filter canister to a microwave heater for regeneration in a continuous process.
Figure 5D:
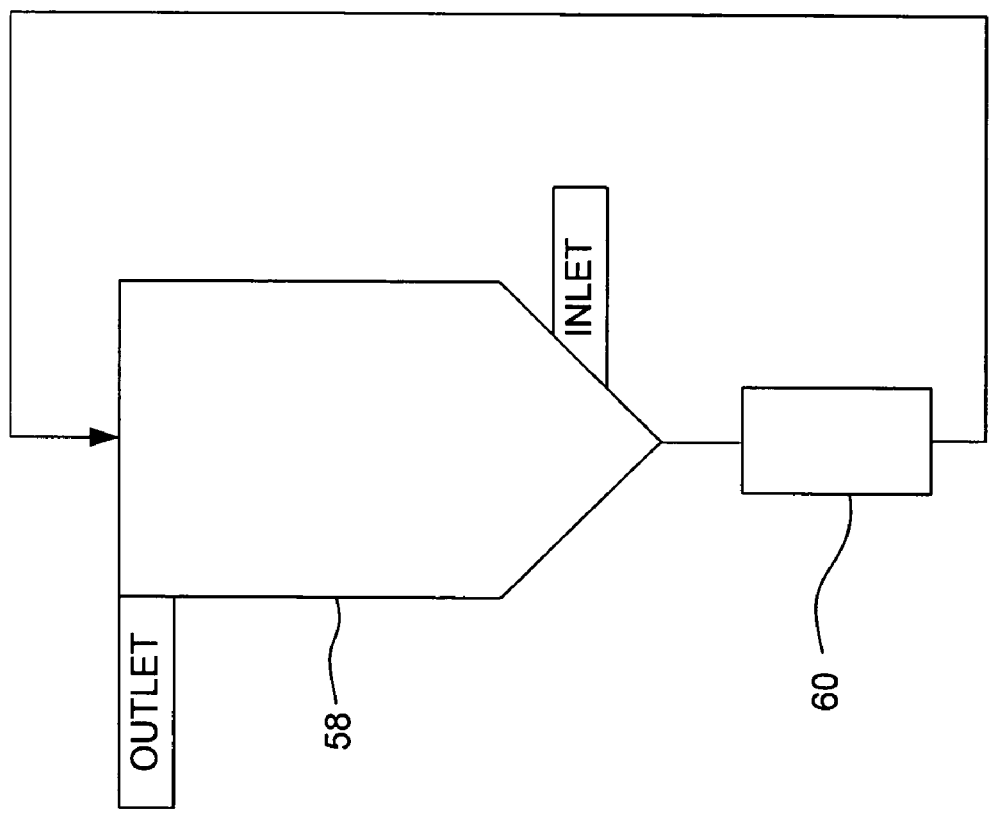
Figure 6:
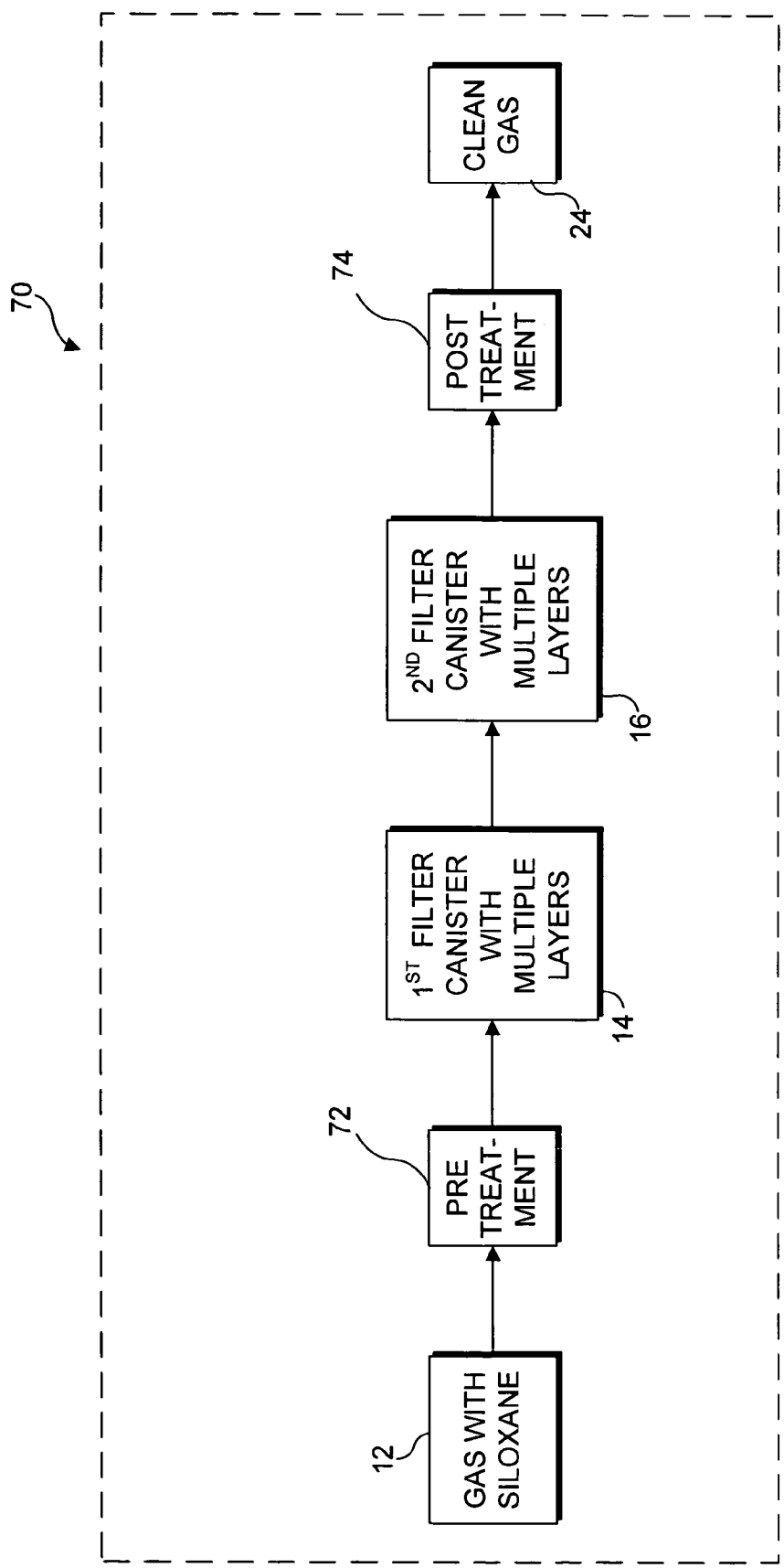

FIG. 5D schematically illustrates a moving bed filter canister in fluid communication with a filter media regeneration unit; and FIG. 6 is a block diagram schematically illustrating the elements present in a segmented activity gradient siloxane removal system which includes pre-treatment and post-treatment processing units.

DESCRIPTION OF THE PREFERRED EMBODIMENT

Overview

Traditional gas filtration is based on passing the gas stream through a container filled with a uniform layer of activated carbon. Commercially available activated carbon, manufactured from wood, sawdust, bituminous coal, rice hulls, lignite, peat, or petroleum residues, generally exhibits a range of pore sizes that varies widely in an individual batch, including pores as small as about 0.7 nm to as large as about 10,000 nm. For filtration based on a homogenous bed of activated carbon, some variation in pore sizes are actually a benefit, because that homogenous filter bed will include pores able to facilitate the removal of molecules of widely disparate sizes. While pore sizes in excess of about 500 nm are generally too large to facilitate adsorption of gas molecules, the wide variation of pores sizes from about 0.7 nm to about 500 nm enable activated carbons to serve as a good adsorbent material for a wide variety of materials. Homogeneous activated carbon filter beds can successfully remove a wide range of contaminants from fluids, however, certain compounds, such as siloxanes in part per million quantities, pose a significant removal challenge for such homogeneous activated carbon filter beds.

Activated carbon produced from anthracite coal (note that anthracite coal is generally disfavored in the United States as a carbon source for activated carbon) presents a dramatically different pore structure. The Datong HuiBao Company, Ltd., of Beijing, China, produces anthracite based carbon in pellet form in number of different pellet seizes and grades. Each distinct grade and pellet size exhibits a very narrow range of pore sizes, as will be discussed in greater detail below. While the production process utilized by the manufacturer appears to be proprietary, the production process results in a product with very distinct and well controlled pore sizes, dramatically unlike the pore structure of conventional activated carbons. By empirically measuring the pore size of each available grade of anthracite based carbon filter media, it has been determined that 40 distinctly different types of filter media are available, each with a unique and narrow range of pore sizes. This determination has enabled an improved method for removing siloxane contaminants from gases to be achieved, by constructing layered filter bed, wherein the media in each layer has been selected, based on the pore sizes of the media, to selectively favor the removal of one class of the contaminants entrained in the gas stream. The layers are arranged in sequence such that the layer with the largest pore sizes is closest to the gas inlet, and the layer with the smallest pore sizes is closest to the gas outlet.

Essentially, the pore sizes of available filter media are determined, the composition of the gas to be filtered is determined, and a filter bed is designed with a layer for each different class of contaminants found in the gas stream. The filter media whose range of pore sizes generally corresponds to the molecular size of a specific class is selected for use in the layer configured to selectively remove that class of contaminant. Empirical data related to the performance of specific grades with specific classes of contaminants are used to further refine a model based on pore sizes and molecular weights of the contaminants. In general, the larger the concentration of a particular class of contaminant, the larger the layer configured to selectively remove that class of contaminant will be.

It should be noted that while the anthracite coal-based carbons provided, for example, by Datong HuiBao represent a preferred source of filter media for use in the present invention, any carbon-based filter media can be employed, as long as a plurality of different grades of filter media are available, and that those different grades are distinguishable based on the range of pore sizes exhibited in that grade. Most conventional activated carbons either are only available in a single grade of pore sizes (such as activated carbon from coconut shells, in which most of the pores are of a relatively small size), or have pore sizes that vary from very large (i.e., over 500 nm) to very small (i.e., less than about 1 nm) in the same batch of carbon, with no narrow range of average pore size being present. Pores sizes useful for removal of contaminants from a gas stream range from about 3 nm to about 500 nm. As noted above, pores larger in size than about 500 nm are too large to facilitate the removal of contaminants from a gas stream. A preferable carbon based filter media will be available in a range of different grades, where the different grades exhibit different average pore sizes. For example, a preferable filter media would be available in a grade whose average pore size is about 3 nm, as well as in other grades that gradually increase in average pore size up to a maximum of about 500 nm. The term average pore size recognizes that there will be some variation in pore sizes for a given grade of filter media, but at least 50% of the pores will vary within a relatively narrow range, preferably varying plus or minus about 25 nm from an average value, and more preferably varying plus or minus about 5 nm from an average value, and most preferably varying plus or minus about 0.5 nm from an average value. Many of the anthracite carbon grades provided by Datong HuiBao have pore sizes wherein about 85% of the pores vary plus or minus about 0.5 nm from an average value (i.e. most pores range from about 2 nm to about 3 nm for a first grade, and range from about 2.5 nm to about 3.5 nm for a second grade, and so on). Because the pore size of the filter media very closely corresponds to the size (i.e. the class) of contaminants that will be preferentially removed by a different grade of filter media, it is important that the plurality of different grades cover the range of contaminants that need to be removed. Thus, even if no grade is available with pores averaging about 300 nm, if there are no contaminants corresponding to that pore size to be removed, the lack of that grade is not important. The material provided by Datong HuiBao includes grades having pores as small as about 0.7 nm to as large as about 100 nm. While that range of grades does not include grades having average pore sizes up to 500 nm, the range available is particularly well suited to siloxane removal. A key aspect of the present invention was the realization that the materials available from Datong HuiBao could be sorted by pore size, and that the available pore sizes could be used to design a multi-layer filter bed, where each different layer preferentially removed classes of contaminants that included the relatively difficult to remove siloxanes. Carbon from other sources can be tested using conventional techniques to determine the average pore size of the material, to determine if other carbons express a similar well defined narrow range of pore sizes that can be similarly manipulated to produce a multi-layer filter, where each layer exhibits a pore size that preferentially removes a specific class of contaminants. Available techniques for determining pore size include the Brunauer-Emmett-Teller (BET) model, argon porosimetry, and mercury porosimetry.

The following text will first discuss the principles behind the use of multiple layers (with each layer being selected to remove a specific class of contaminants), then discuss the specific properties of the preferred polymorphous graphite filter media, and finally discuss preferred systems and method of implementing the present invention.

Overall Multi Layer Filter Process Description

The use of a plurality of different layers, each layer being selected to remove a specific class of contaminants, is referred to herein, and in the claims that follow, as the Segmented Activity Gradient (SAG) process. The characteristics of each layer are selected to remove, concentrate, and retain a specific class of contaminants. The term Segmented Activity Gradient refers to the manner in which the individual layers work together to achieve the desired removal of contaminants. The media are arranged in layers, or segments, inside a container, such as metal (or glass, or plastic, though metal is preferred) vessel or column, to achieve the desired effect. The gas flow passes through each media layers or segments in succession. The gas flow can be upward (upflow), downward (downflow), or radial (either outward to inward or inward to outward) through an annulus containing the segments. The media in each layer is specifically selected to remove specific classes of contaminants from the gas (such as a biogas). As the gas passes through these media layers arranged in a certain order, the offending contaminants are removed in a sequential order. This plurality of media layers or segments to effect sequential removal is the gradient. This sequential contaminant removal is characteristic of the SAG process, and is the mechanism by which gas purity and process economy is achieved.

In contrast to the SAG process, a single homogeneous layer of sorptive, adsorptive or sieving media (such as an activated carbon) used for siloxane removal suffers from the adverse effect of the various classes of offending species competing for removal within the same layer of media. The effect of this competition is very poor removal (or no-removal at all) of some of the offending species. Gas purity and the economics of gas purification using a single homogeneous layer of media are often unacceptably poor.

The media segments in the SAG process gradient are selected based on their ability to remove a certain classes of contaminants. Contaminant classes are based primarily on molecular weight and molecular size. In a typical biogas, there are three to six classes of contaminants, including those of molecular weights from (approximately) below 50, 50 to 75, 75 to 125, 125 to 175, 175 to 250, and above 250. The number of media types selected for a particular gradient is based primarily on the number of classes of contaminants and the concentration of contaminants in each class.

Determination of the classes of contaminants in a gas is accomplished by four main test methods. These are: major gas constituents (including total C6+), siloxanes analysis, total volatile organic carbon (VOC) analysis and determination of sulfur-containing species.

The classification of the VOCs and their commensurate concentrations enables the gradient (i.e. the number and composition of each of the plurality of layers) to be defined. For example, a first grade of filter media is selected to specifically remove high molecular weight VOCs and siloxanes (by selecting a grade of filter media whose average pore size preferentially removes such compounds). Another grade of filter media is selected for removal of medium molecular weight siloxanes (again by selecting a grade of filter media whose average pore size preferentially removes such compounds). A third grade of filter media is selected for removal of low molecular weight siloxanes and other silicon-bearing organics including those belonging to the alcohol and ether classes (i.e., trimethylsilanol and disilyl ether). Other media grades can be selected (based on the average pore size of the media) to remove very heavy molecular weight organics and the low molecular weight chlorinated species. Segmenting such media layers in the filter chamber in a certain order with respect to the gas flow direction produces a working gradient over which the removal of the offending species occurs. The media layer depths vary in proportion to the concentration of VOCs and siloxanes in the various classes in the biogas (i.e. the more of a specific class of contaminants is present, the thicker the layer engineered to remove that class needs to be).

Layers are selected by matching the average pore size of the grade of filter media to the molecular weight of the contaminant. Logically, larger molecules will require larger pores. An initial model that relates an average pore size to a range of molecular weights by comparing calculated molecular sizes to empirically measured pore sizes. Empirical knowledge can be used to refine such a model. For example, based on calculated molecular sizes, one might conclude that filter media grade X will preferentially remove contaminant A (the average pore size of filter media grade X being slightly larger than the calculated molecular size of contaminant A). Empirical data collected based on removing contaminant A using filter media grades X, Y and Z might indicate that filter media grade Z (the average pore size of filter media grade Z being larger than the average pore size of filter media grade X) is more effective at removing contaminant Y than filter media grade X. Such empirical data can be used improve the model used to identify which grade of filter media should be used to preferentially remove certain contaminants.

It is very difficult to accurately measure the "size" of molecules; thus, collecting and using empirical data will enable a much better model to be developed. Initially the molecular weights of contaminants can be used to determine whether the filter media selected should have pores sizes that are generally at the smaller end of the range of available pores sizes, or at the larger end of the range of available pores sizes (contaminants with larger molecular weights will require larger pore sizes). Particularly when several grades of filter media are available with closely related pore sizes, empirical data can indicate which of those grades provides the best removal efficiency for a particular contaminant. A table, which relates molecular weight to a range of pore sizes is provided below, which can be used as an initial starting point for selecting a grade of filter media, until empirical data indicates that a different grade is more effective at removing a particular compound.

The Steps Required to Implement the SAG Process

FIG. 1 is a flowchart 10 which illustrates the overall sequence of steps utilized to design and implement a siloxane removal system in accord with the present invention. In a block 12 a sample of the gas to be filtered is taken. In addition to taking a sample, a determination of the following gas parameters needs to be made: a determination of biogas flow, a determination of the temperature of the biogas, and a determination of the pressure of the biogas. In a block 14, the sample is analyzed. The analysis of the gas sample will includes testing the gas (a biogas or other gas potentially contaminated with siloxanes) for siloxanes, VOCs, and sulfur. In a block 16, a SAG profile is developed (i.e. a determination of how many layers will be required, and what the optimal composition and depth of each layer will be). In a block 18, different grades of the polymorphous graphite filter media are used to achieve the layers determined in block 16. In a block 20 a system is installed based on the SAG profile developed in block 16. In a block 22 the filtered gas is analyzed to determine if breakthrough of the SAG filter beds has occurred (indicating one or more layers of the filter media need to be replaced or regenerated). In a block 24, one or more of the SAG media layers is replaced or regenerated.

Additional details relating to block 16, in which the SAG profile is determined based on the specific gas composition, will now be described. It should be noted that more contaminants can be removed in a properly engineered SAG filter than can be removed in a homogeneous media bed filter, because in a SAG filter species removal occurs in a certain zone (i.e. layer), and competition for adsorption sites in that layer from other species is significantly reduced or eliminated. For example, if it is desired to remove the siloxane species MM, D4 and D5, a layer of filter media is selected (based on the pore size of the media, the molecular weight of D4, and any empirical knowledge indicating which grade is most suited to removing D4), a layer of filter media is selected to favor the removal of the D5 (based on the pore size of the media, the molecular weight of D5, and any empirical knowledge indicating which grade is most suited to removing D5), and a layer of filter media is selected to favor the removal of the MM (based on the pore size of the media, the molecular weight of MM, and any empirical knowledge indicating which grade is most suited to removing MM). If it is also desirable to additionally remove benzene, toluene, ethyl benzene and xylems (collectively referred to as BTEX compounds), a layer of filter media selected to optimize removal of BTEX compounds would be employed. If it is also desirable to remove lower molecular weight organics, including chlorinated species, yet another layer of filter media selected to optimize removal of such species would be employed. The various layers (sub-gradients) of media employed to perform the desired level of gas purification constitute the gradient. The gradient, G, established for the removal of any species, can be expressed as follows:

$$G = \Sigma(g_1 + g_2 + \ldots g_n)$$

The average gradient property with respect to the removal of a certain class of contaminants (such as the siloxane MM) is the sum of the individual sub-gradient (g) properties ($g_p$) as measured by the work performed (such as moles removed) by each sub-gradient:

$$G_{pavg} = \frac{\sum (g_{p1} + g_{p2} + \cdots g_{pn})}{n}$$

For example, if segments $g_1$ and $g_2$ are installed for removal of contaminant species other than the siloxane MM, then $g_{p1}$ and $g_{p2}$ could equal zero, and a third media segment and perhaps even a fourth media segment would have a value greater than zero specifically for siloxane MM.

The gradient, G, is further defined by the Range of work performed by each sub-gradient (i.e. each engineered media layer) below and above the average work performed. This gradient range, $r_G$, is defined as $r_G = G_{pavg} 0.10SI$, $r_G = G_{pavg} \pm 0.25SI$, $r_G = G_{pavg} \pm 0.50SI$ or $r_G = G_{pavg} \pm 1.0SI$. The term SI is the "Siloxane Index": of the filter media, a dimensionless value empirically derived from a specific media's capacity for a specific siloxane, the orthobaric liquid density of the specific siloxane, and the volumetric density of the media.

Based on the specific composition of the gas stream to be filtered (based on the sample analysis), the gas contaminants can be separated into different classes, according to the molecular weight of the contaminants. The molecular weight of the different classes are compared the porosities of the different grades of filter media available. Preferably a computer model is developed that includes all of the pore sizes available in the different grades of filter media and a theoretical range of molecular weights each different pore size will preferentially remove. Initially the model can be constructed using physical data known about each type of contaminant likely to be present in the gas stream to be filtered. Such physical data will include the molecular weight of the contaminant, and will often include an estimate of the size of each contaminant molecule. An initial assumption that a preferred pore size will be about 10-50% (and more preferably about 10-25%) larger than the contaminant molecule to remove will be made, enabling the model to suggest a particular grade of filter media (based on the pore size of that grade) for a particular contaminant (or class of contaminant). As empirical data is gained relative to the use of certain grades of filter media with specific contaminants, changes can be made to the model to improve the model. The computer model currently being used includes a mixture a theoretical data and empirical data, and provides a very accurate indication of which grades of filter media should be used for a particular mix of contaminants.

Each class of contaminants (i.e. contaminants of closely related molecular weights) will be assigned a specific grade of filter media. The volume of filter media required is a function both of the removal efficiency for that class, and the concentration of the contaminant. In general, the higher the concentration of the contaminant, the more filter media will be required. Similarly, the lower the removal efficiency for a particular class of contaminants is, the more filter media is required. The layers will be arranged in sequence such that the larger the pores of the filter media, the closer that layer will be to the gas inlet. This ensures that larger molecules are removed first, such that those larger molecules do not "clog" the smaller pores of the latter layers of filter media.

Preferably, each grade of filter media will be of a common size and shape, such that a physically uniform filter bed can be achieved (even though different layers in that bed will have different pore sizes). This simplifies flow rate calculations, and enables conventional gas processing relationships to be used to determine how much of each filter media is required, based on a given flow rate and a given mix of contaminants. It should be noted that empirical studies have indicated that siloxane removal using the SAG and the preferred carbon filter media is enhanced by the use of flow rates that are substantially lower than normally employed in conventional activated carbon beds. Preferred flow rates range from about 4 fpm to about 28 fpm, with a particularly preferred range being from about 4 fpm to about 15 fpm. Conventional carbon filtration uses flow rates from as low as 50 fpm to as high as 125 fpm.

Figures 2A, 2B:
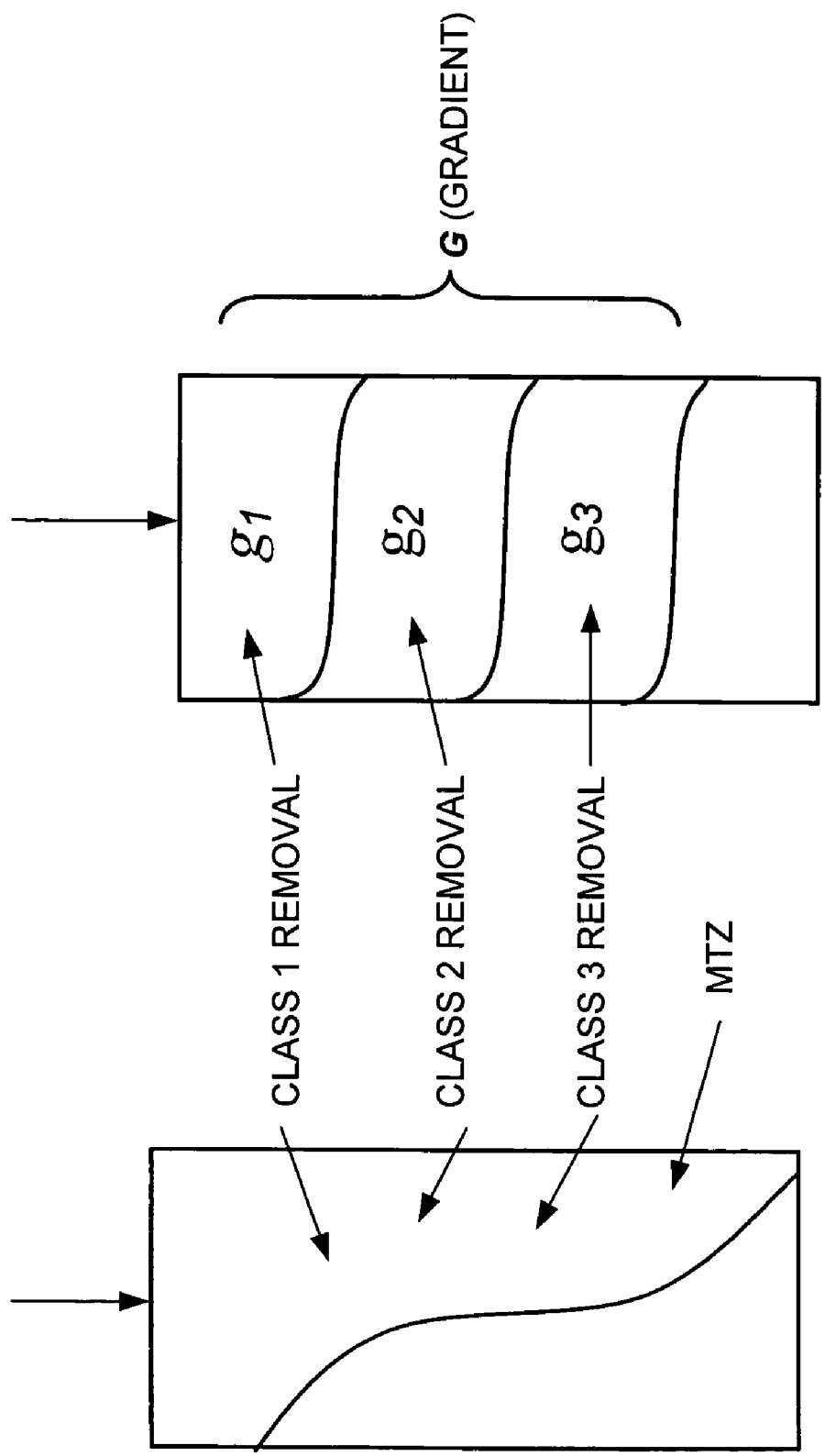

To enhance the performance of anaerobic digesters in WWTP, such anaerobic digesters are often operated at high temperatures. The use of thermophilic anaerobic bacteria enables the high temperature operation and production of methane. Unfortunately, this higher temperature also leads to higher volatilization of undigested organics such as BTEX compounds and low-to-medium molecular weight chlorinated organics. Thus a typical biogas stream may include siloxanes, BTEX compounds, and low-to-medium molecular weight chlorinated organics. With respect to activated carbon, high molecular weight siloxanes are strongly adsorbed molecules, and will be preferentially adsorbed over the BTEX compounds, which in turn, are preferentially adsorbed over the low-to-medium molecular weight chlorinated organics. In a typical homogenous activated carbon bed (i.e. no sub-gradient layers), molecular species from the above three groups (siloxanes, BTEX compounds, and low molecular weight contaminants) will compete for the same adsorption sites. Unfortunately, some of the siloxanes will not be adsorbed because they will be too large to be accommodated by the pores of the activated carbon. Some of the low-to-medium molecular weight chlorinated organics will not be adsorbed because they will be displaced by the BTEX compounds. In an adsorbent bed such as activated carbon, the zone in which removal of the molecular contaminants occurs is called the Mass Transfer Zone, or MTZ. A simple definition of this is the zone between the part of the media bed where there is no removal and the part of the media bed where there is 100% removal. It is estimated that in typical applications, this depth is between 50 and 100 mm for removal of a homogeneously contaminated (one contaminant) gas or air stream. However, when a digester or landfill gas stream passes through an activated carbon bed, this MTZ will contain a mixture of all absorbable species and can "stretch" to beyond the length of the media bed. As the more strongly adsorbed species accumulate toward the leading edge of this zone, they will "push off" or displace less strongly adsorbed species. These displaced species will move further into the bed, where this process of adsorption and displacement is repeated until breakthrough from the bed occurs. This process in a prior art homogeneous filter is illustrated in FIG. 2A. In contrast, FIG. 2B schematically illustrates a filter bed including three sub-gradient layers g1, g2 and g3; each of which have been engineered to favor the removal of a specific one of three different classes of contaminants. Collectively, the three sub-gradients form a gradient. Thus in the SAG process, more than one type of filter media (or sub-gradient) is required. These media are selected based on what types of molecules are to be removed and their relative concentrations. Completion of a gradient can require the use of 3, 4, or even 5 or more different sub-gradients. By segmenting the filter bed into different media zones, competition for removal among the species is greatly reduced or eliminated. This results in a higher removal capacity for all of the species being removed. The direct result of this higher capacity is more complete removal, longer run times and a more economical operation.

It is important to understand that individual layers (i.e. individual gradients) may not be different in chemical composition (i.e. each layer may be anthracite based carbon filter media), but rather each layer will differ in the average size of the pores in that layer of filter media.

The Polymorphous Graphite Media

The different grades of polymorphous graphite media (PMG) media used in the SAG process are manufactured from graphite electrode grade anthracite, which is also used in the manufacture of graphite electrodes for purposes such as the smelting and refining of aluminum metal. The preferred supplier of the PMG media for the SAG process is Datong HuiBao Company, Ltd., whose offices are in Beijing, China. The PMG material is provided as generally cylindrical pellets, about 8 millimeters in length. The PMG media are manufactured by a process considered by Datong HuiBao to be a trade secret, and are marketed by Datong HuiBao as HBC1 (1.0 mm diameter pellets), HBC2 (1.5 mm diameter pellets), HBC3 (2.0 mm diameter pellets), HBC4 (3.0 mm diameter pellets) and HBC5 (4.0 mm diameter pellets). Each different diameter is available in 8 grades, and empirical data has verified that each diameter and grade exhibits a unique and narrow range of porosity. For example, empirical testing (based on argon porosimetry) have identified one specific grade in which the average pore sizes range from about 1.5 nm to about 2.0 nm, another specific grade in which the average pore sizes range from about 2.0 nm to about 3.0 nm, and yet another specific grade in which the average pore sizes range from about 2.5 nm to about 3.5 nm.

Each batch received is tested to determine the average pore size of the batch, and to confirm that the pore sizes in a specific batch vary over a relatively narrow range (preferably plus or minus about 5 nm, and more preferably plus or minus about 0.5 nm). Thus any changes in the manufacturing process which might affect the pores sizes will be noted. While it appears that is Datong HuiBao is only supplier of the preferred PMG material, it should be noted that other vendors could be utilized if empirical porosity data indicates that different grades of filter media exhibit narrow ranges of average pore size (i.e. plus or minus about 5 nm, and more preferably plus or minus about 0.5 nm). The narrower range is preferred for siloxane removal, but if a SAG process is to be used to filter other contaminants, other broader ranges could be useful.

Typically, PMG media of one size (i.e. of the same average diameter and length) are used to construct a SAG process gradient (to achieve a physically uniform bed), although it is possible to employ the use of different sized media within the same gradient. The gradient is constructed of PMG media with at least three different sub gradient layers (although some very simple gas streams might require only two layers), and each sub gradient layer has a unique range of pore sizes. The pore size ranges are selected based on the types of contaminants desired to be removed. Lower molecular weight contaminants will be removed in the PMG media layers with smaller pores (2.0 nm and smaller) and higher molecular weight contaminants will be removed in PMG media layers with larger pores (>2.0 nm and toward 10 nm).

PMG differs from activated carbon in that the different types of PMG available enable control of pore sizes in a sub-gradient to be achieved. Control of pore sizes within a sub-gradient enable the sub-gradient to be "tuned" to preferably remove specific classes of contaminants. Where activated carbon filtration is typically implemented as a single layer, the SAG processing using PMG media utilizes multiple layers (sub-gradients) to remove contaminants in a preferred order to achieve better overall removal; and to protect succeeding layers of the PMG media from fouling by larger molecules that would hamper their proper function. The layers are ordered so that larger molecules are removed first, and smaller molecules are removed last.

PMG differs from activated carbon not only because of the narrow range of pore sizes in the different grades of PMG, but also in its ability to be regenerated by microwave radiation. The chemical make-up of PMG media permits uniform heating and does not arc (i.e. does not generate sparks) during microwave irradiation, as many other activated carbons do. Activated carbons that are made from bituminous coal, lignite, wood (and sometimes even coconut shell) contain ash, which is mineral in nature. The ash levels in conventional activated carbon (i.e. activated carbons not made from anthracite) vary from about 2-3% ash for good, clean coconut shell carbon to as high as 30% ash for some bituminous coal-based carbons. The preferred anthracite based PMG media usually varies between 2% and 6% ash. If the ash level in the activated carbon is too high, arcing can occur during microwave irradiation. This can not only damage the magnetron and weaken other metal parts in the regeneration equipment, but it can also cause very uneven heating and poor regeneration of the media. Naturally, arcing in a fuel gas environment is undesirable from an explosion or fire standpoint. This is a primary reason microwave energy is not employed to regenerate activated carbon. While low ash coconut shell activated carbon could be regenerated using microwaves, coconut shell based activated carbons are not well suited to siloxane removal in general, and the characteristic flake structure of coconut shell activated carbon is more difficult to move using pneumatic transfer equipment than the anthracite coal based pellets noted above.

Preferred Analytical Methods for Analyzing Gas Samples

The media in each sub-gradient in the SAG process gradient are selected based on their ability to remove each of the certain classes of contaminants. Contaminant classes are based primarily on molecular weight and molecular size. As noted above, in a typical biogas, there are three to six classes of contaminants, including those of molecular weights from (approximately) below 50, 50 to 75, 75 to 125, 125 to 175, 175 to 250, and above 250. The number of media types selected for a particular gradient is based primarily on the number of classes of contaminants and the concentration of contaminants in each class.

Determination of the classes of contaminants in a biogas is accomplished by several test methods. The first method is siloxane analysis by the chilled methanol impinger method. This test is performed by bubbling a specified volume of the biogas through two midget gas impingers each containing nominally 15 milliliters of high purity grade methanol. The siloxanes in the biogas are dissolved in the methanol, which is kept chilled at forty degrees Fahrenheit until analyzed. The methanol from these impingers is analyzed by gas chromatography and mass spectrometry to determine both the species of siloxanes present and their individual concentrations. These data are in turn used to calculate the concentration of each siloxane present in the biogas.

Sampling of the gas can be accomplished by either a one liter Tedlar bag or evacuated metal canister containing one to two liters of the biogas is adequate to perform the remainder of the tests required. The second test method used to determine the classes of contaminants in the biogas is the EPA Method TO-14A or EPA Method TO-15. Either method determines the presence and concentration of contaminants appearing on a list of 62 individual species. This test method is useful for identification of the halogenated and other highly volatile contaminants typically present in landfill gas, but which are also found in municipal digester gas. A properly equipped laboratory will be able to also identify contaminants in addition to those on the list of 62. Mass spectral matches of gas chromatography elutriation peaks often produce an additional 10 or 20 contaminants that are reported as "tentatively identified compounds" or "TICs".

The third test method to determine contaminants in biogas is a modified EPA Method 18. This test method is based on gas chromatography and mass spectrometry, however, instrument calibration to accommodate a contaminant concentration range of more than seven orders of magnitude is possible. This broad range of contaminant quantification renders the modified EPA Method 18 an extremely useful tool for analyzing highly contaminated biogases.

The fourth test method employed to determine contaminants in biogas is specific to sulfur-containing species. In addition to hydrogen sulfide, 19 other sulfurous species are identified and quantified by the ASTM D5504 method. This test utilizes a gas chromatograph equipped with a sulfur chemiluminescence detector (SCD) to measure inorganic and organic sulfur species down to the low parts per billion by volume (ppbv) level.

The combined results of the four test methods described above have yielded a list of biogas contaminants that exceeds 250 in number and is increasing as new species are discovered. As new species are encountered, the model is updated to related each species with a grade of filter media to be used to preferentially remove that species.

Customizing the Gradient (and Sub-Gradients) to the Sample Analysis

Results from the various biogas contaminant tests are analyzed by computer to determine the proper PMG media types and quantities of each to use for purification, using the computer model discussed above. The output from the computer model includes selection of the vessel diameter, the media types and their individual quantities (the sub-gradients or layers), and a speciated contaminant breakthrough analysis based on the raw biogas characteristics. Biogas typically contains (by volume percent) 35% to 70% methane, 30% to 65% carbon dioxide, 0% to 40% nitrogen, 0% to 10% Oxygen, 2% to 8% water vapor, trace levels (ppmv range) of alkanes, alkenes, isoalkanes and isoalkenes-type gases, 5 ppm to 2,500 ppm sulfurous contaminants, and from about 25 ppm to as much as 1,500 ppm of Volatile Organic Contaminants (VOCs). It is this VOC contamination, part of which is made up of siloxanes and halogenated chemicals, that is classified for removal by a SAG Process.

The classification of the VOCs and their commensurate concentrations forms the basis of the media segments to construct the siloxane removal gradient. For example, one type of PMG media is selected to specifically remove high molecular weight VOCs and siloxanes. Another one is selected for removal of the medium molecular weight siloxanes. A third one is selected for removal of low molecular weight siloxanes and other silicon-bearing organics including those belonging to the alcohol and ether classes (i.e., trimethylsilanol and disilyl ether). Other PMG media are capable of removing very heavy molecular weight organics and the low molecular weight chlorinated species. Segmenting, or layering these media in the filter chamber in a certain order with respect to the gas flow direction produces a working gradient over which the removal of the offending species occurs. The media layer depths vary in proportion to the concentration of VOCs and siloxanes in the various classes in the biogas.

To further explain how the SAG profile is developed based on a specific gas stream; assume that a biogas stream has been analyzed with the following results:

| Contaminant | Concentration, ppbv | Molecular Weight |
|---|---|---|
| Trimethylsilanol | 500 | 90 |
| Pentatamethyldisiloxane | 1500 | 148 |
| Octamethyltrisiloxane | 1000 | 237 |

The molecular weights indicate that three different sub-gradients will be required (i.e. none of the molecular weights are substantially similar), and empirical data added to the computer model confirm this assumption. The molecular weight of octamethyltrisiloxane falls within the range of 175 to 250, and the model (based both on the physical characteristics of octamethyltrisiloxane and empirical data) indicates the PMG filter media which will preferentially remove octamethyltrisiloxane is the grade of PMG filter media having an average pore size of greater than 2.5 nm and less than 3.5 nm. The molecular weight of pentamethyldisiloxane falls within the range of 125 to 175, and the model (based both on the physical characteristics of pentamethyldisiloxane and empirical data) indicates the PMG filter media which will preferentially remove pentamethyldisiloxane is the grade of PMG filter media having an average pore size of greater than 2.0 nm and less than 3.0 nm. Finally, the molecular weight of trimethylsilanol falls within the range of 75 to 125, and the model (based both on the physical characteristics of trimethylsilanol and empirical data) indicates the PMG filter media which will preferentially remove trimethylsilanol is the grade of PMG filter media having an average pore size of greater than 1.5 nm and less than 2.0 nm. The gradient defined by the model will include three sub-gradients, and the sub-gradient closest to the gas inlet will be the PMG material selected to preferentially remove octamethyltrisiloxane. The removal efficiencies of the PMG media for most siloxanes is roughly equivalent, thus the approximately three times as much PMG media selected for pentamethyldisiloxane removal would be required, as compared to the amount of PMG media selected for trimethylsilanol removal. Similarly, approximately two times as much PMG media selected for octamethyltrisiloxane removal would be required, as compared to the amount of PMG media selected for trimethylsilanol removal.

The following table provides a correlation between pore sizes and molecular weight. While this table is a useful starting point for initially selecting a grade of filter media, empirical testing on specific contaminant may indicate that a different grade (i.e. a grade of filter media having pores of a different size) is more effective at removing that particular contaminant.

| Contaminant Molecular Weight Range | Relative PMG Media Pore Size |
|---|---|
| <50 | 0.7-1.5 |
| 50 to 75 | 1.5 to 2.0 |
| 75 to 125 | 2.0 to 2.5 |
| 125 to 175 | 2.0 to 3.0 |
| 175 to 250 | 2.5 to 3.5 |
| >250 | 3.5 to >3.5 |

Basic SAG/PMG Systems

Figure 3:
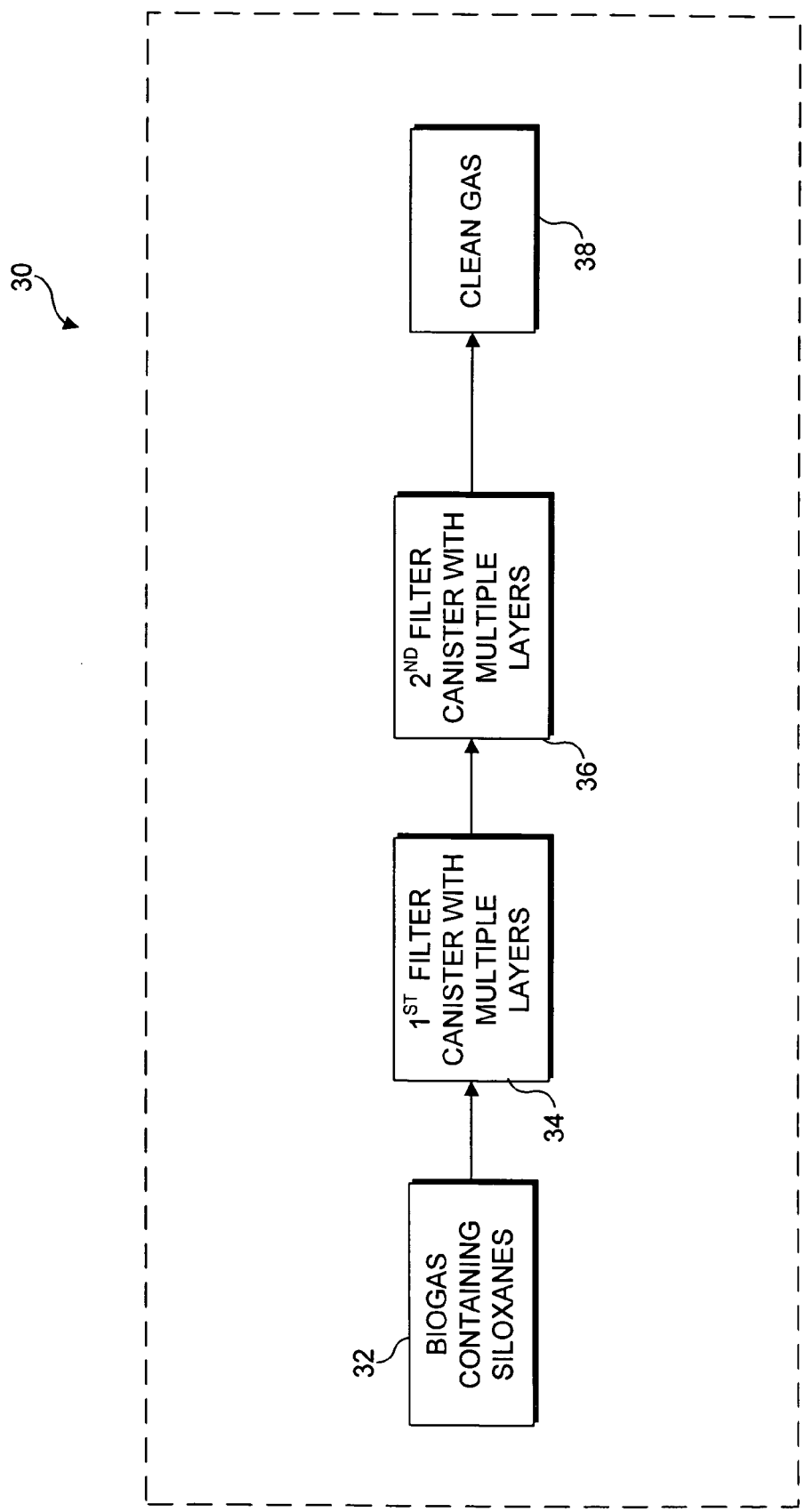

FIG. 3 schematically illustrates the components of a basic SAG/PMG system 30 in accord with the present invention. A block 32 represents a biogas (or other gas stream) contaminated with siloxanes being directed into a first filter canister 34, which includes a plurality of sub-gradients or layers of PMG filter media. The partially filtered gas is then directed to a second filter canister 36, which also includes a plurality of sub-gradients or layers of PMG filter media. Collectively, the sub-gradients in the first and second filter canisters are configured to remove the siloxanes and other contaminants in the gas stream, as identified in the sample analysis described above. Clean gas exits the second canister, as indicated by a block 38. While system 30 is shown with two canisters, it should be understood that more than two canisters can be employed. It is particularly useful to keep a replacement for each canister ready, such that if the media in one canister becomes saturated, then a replacement canister can be quickly placed in service. It should be noted that based on the gas profile determined by the sample analysis, estimated media life for each sub-gradient can be calculated. In systems where the desired removal sequence enables longer lived sub-gradients to be placed in one canister, and more rapidly exhausted sub-gradients to be placed in the other canister, then a replacement canister for only the more rapidly exhausted sub-gradients can be kept at hand. While a single large canister which includes all the sub-gradients required to implement the SAG/PMG process can be used, such an implementation would likely require the use of a larger, more expensive canister, and would also preclude the ability to employ a spare canister filled with shorter lived sub-gradients.

The term canister refers to a generally cylindrical vessel, although it should be understood that the shape of the canister is not critical. The canister should be capable of being sealed, such that the gas to be filtered does not leak out of the canister, nor can ambient gases migrate into the canister. The canister preferably can be opened such that the sub-gradients in the canister can be removed and replaced as required. Generally, each canister will include more than one sub-gradient.

Figure 4B:
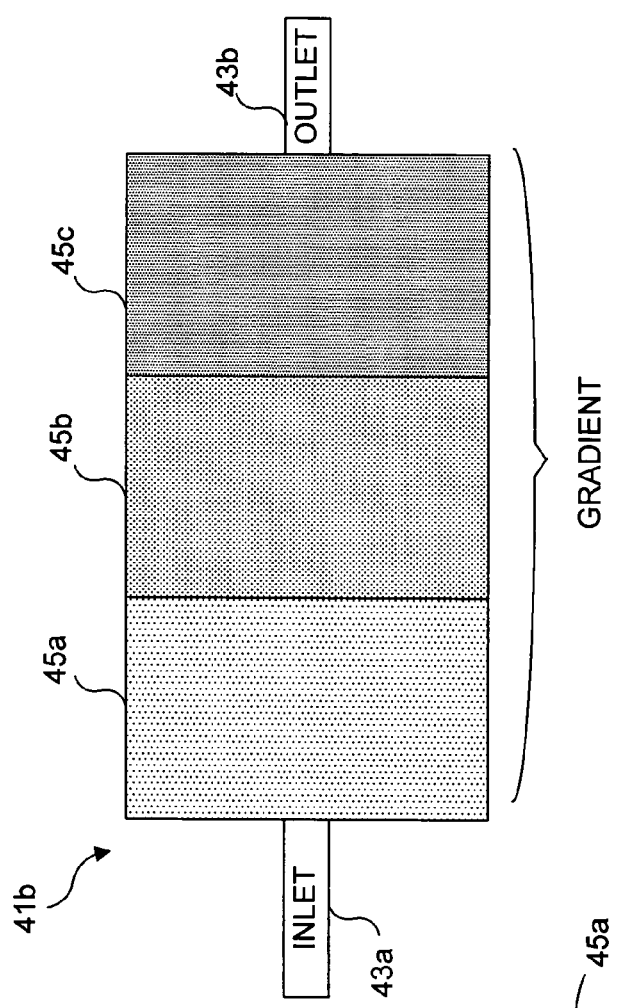
Figure 4A:
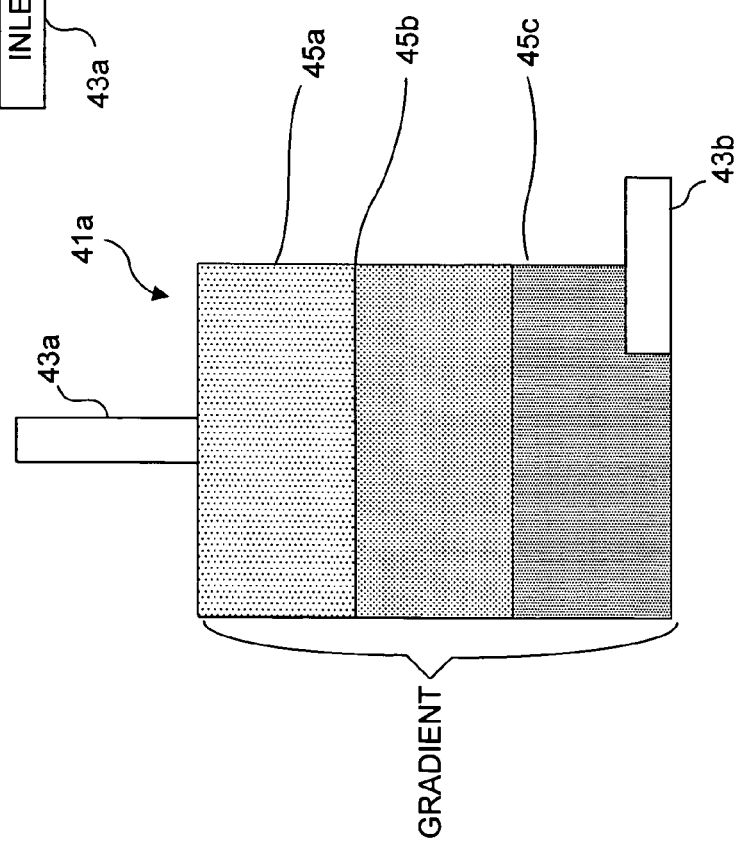

FIG. 4A schematically illustrates a basic filter canister 41a, which includes a gas inlet 43a, a gas outlet 43b, and a plurality of sub-gradient layers 45a, 45b and 45c. Each sub-gradient layer includes PMG media having a pore size selected to optimize the removal of a specific class of contaminants known to be present in the gas to be cleaned. The sub-gradient layer closest to the inlet (i.e. sub-gradient layer 45a) is configured to remove the contaminants that are larger molecules, while the sub-gradient layer closest to the outlet (i.e. sub-gradient layer 45c) is configured (by selecting a PMG media having an average pore size that favors the removal of smaller molecules) to remove smaller molecules. Note the canister in FIG. 4A is configured as a downflow filter. Those of ordinary skill in the art will recognize that filter beds can be configured wherein the gas to be filtered enters the filter at the bottom and moves upwardly through the filter (an upflow filter). Because the sequence of the sub-gradient layers in the filter gradient of the present invention is important, if filter canister 41a is used an upflow filter, the order of the sub-gradient layer would need to be reversed (i.e. sub-gradient layer 45a would need to be at the bottom nearest the inlet, and sub-gradient layer 45c would need to be at the top, near the outlet). While each sub-gradient layer can be separated by a physical gas permeable membrane (such as a wire mesh or a polymer mesh), no such physical barrier is required.

In some applications, as few as three (or even two) sub-gradient layers will be all that is required to complete the gradient determined to be required to remove the contaminants identified in the sample analysis. If additional sub-gradient layers are required, then either a larger canister can be employed to accommodate additional layers, or another canister unit can be employed in series with the first canister unit (as shown in FIG. 3). While as shown sub-gradient layers 45a, 45b and 45c are each of the same general thickness, it should be understood that the thickness (and volume) of each sub-gradient layer is based on the analysis of the contaminants in the gas stream. Sub-gradient layers engineered (by selecting PMG media to obtain a layer having an average porosity that favors the removal of a specific class of contaminants) to favor the removal of a certain class of contaminants will be provided in sufficient volume to removal that class of contaminants. For example, if PMG's removal efficiency for each class of contaminants is the same, and there is twice as much of contaminant Class A than there is of contaminant Class B, then the sub-gradient layer engineered to remove Class A contaminants will have twice the volume of the sub-gradient layer engineered to remove Class B contaminants. Because the removal efficiency of PMG for different classes of contaminants may not always be the same, the relative volume of each sub-gradient layer will be selected to ensure sufficient PMG media is present to remove the selected class of contaminants.

FIG. 4B schematically illustrates a horizontally oriented filter canister 41b, which similarly includes gas inlet 43a, gas outlet 43b, and the plurality of sub-gradient layers 45a, 45b and 45c. If canister 41b is configured to be filled with media from the top, then it may be desirable to include membranes to separate each sub-gradient layer to make filling the canister easier.

Figure 4D:
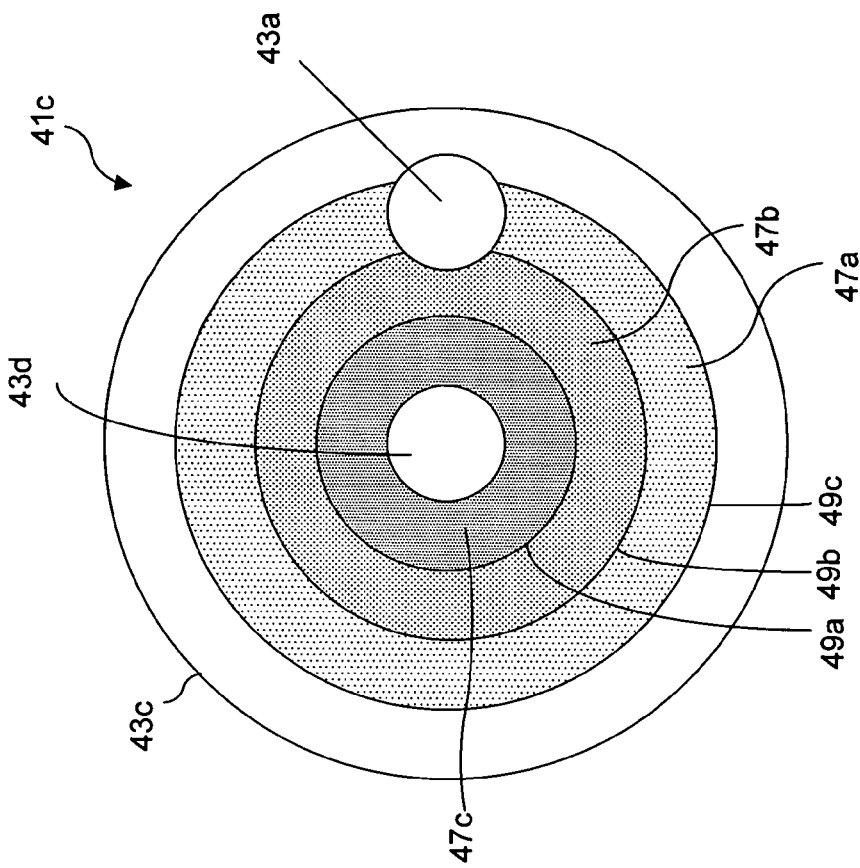
Figure 4C:
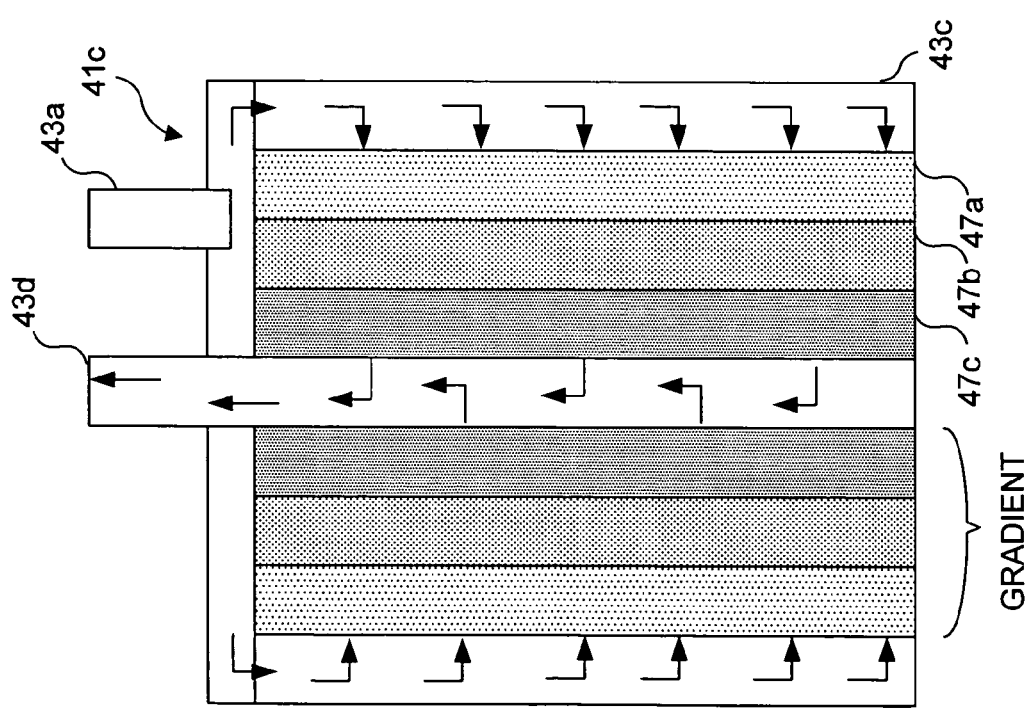

FIGS. 4C and 4D are side and top views, respectively, which schematically illustrate a radially oriented filter canister 41c. Gas inlet 43a is coupled in fluid communication to an outermost annular volume 43c which defines an inlet plenum. A plurality of inner annular volumes correspond to sub-gradient annular volumes 47a, 47b and 47c, with sub-gradient volume 47a being disposed closest to inlet plenum 43c. Gas permeable separators 49a, 49b and 49c, preferably implemented as a wire or polymer mesh (stainless steel mesh is particularly preferred), separate each sub-gradient annular volume. Clean gas exits via a central orifice 43d serving as outlet plenum, preferably implemented as a perforated pipe (such as a stainless steel or polymer pipe).

Figure 4F:
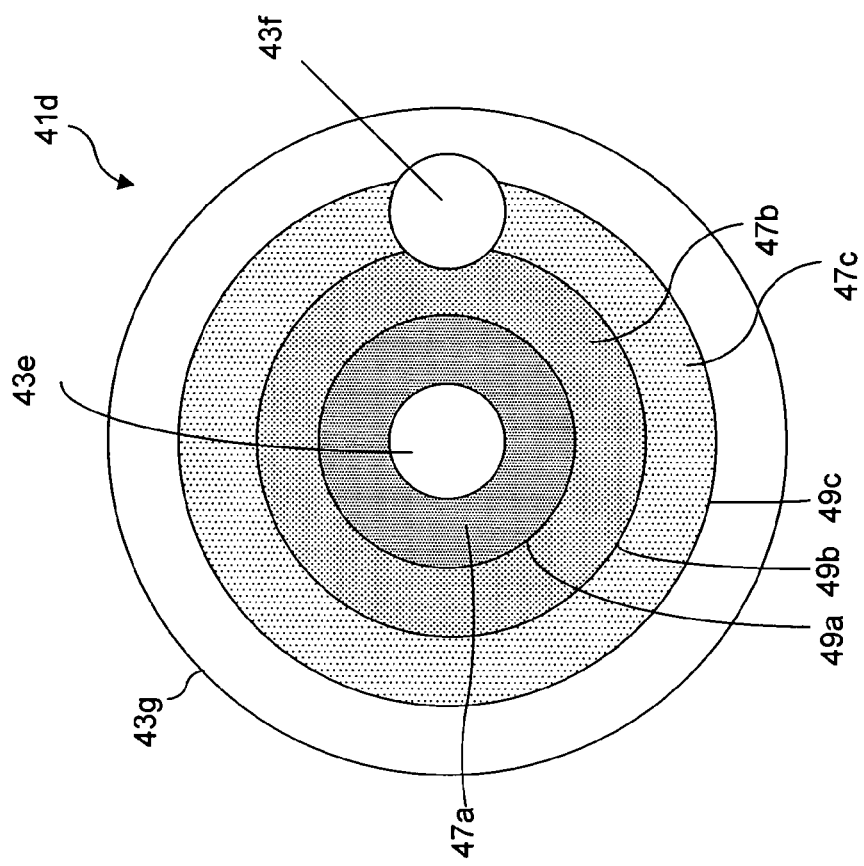
Figure 4E:
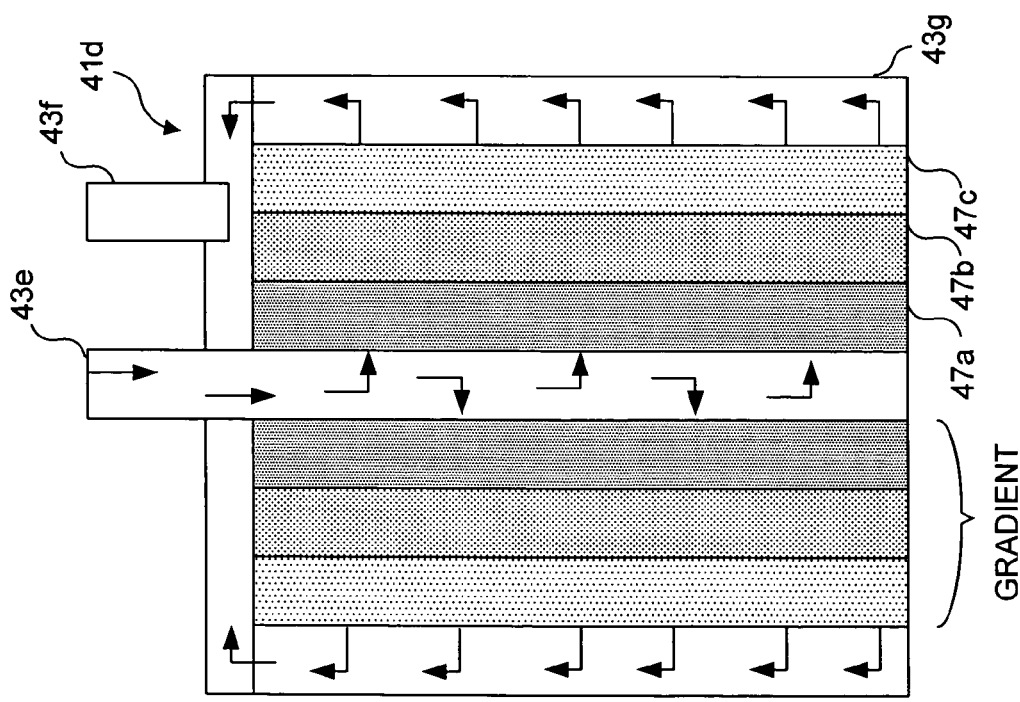

FIGS. 4E and 4F are side and top views, respectively, which schematically illustrate a similar radially oriented filter canister 41d, which is configured to receive a gas flow via a central orifice 43e (acting as an inlet plenum). Note that the relative position of sub-gradient annular volumes 47a and 47c have been switched in canister 41d as compared to canister 41c, so that sub-gradient annular volume 47a is still closest to the gas inlet. Outermost annular volume 43g acts as an outlet plenum, and is coupled in fluid communication to outlet 43f.

FIG. 5A schematically illustrates the components of an SAG/PMG system 40 which includes a regeneration unit for regenerating the PMG media for reuse. One characteristic of the PMG media is that it can be regenerated by heating the PMG media to approximately 600° F. System 40 thus includes filter media transfer equipment 42 and a filter media regeneration unit 44. Preferably the filter media transfer equipment is a pneumatic system that moves the filter media from the first and second canisters to the filter media regeneration unit. Empirical testing has indicated that helical microwave units can be used as a heat source for regenerating the PMG filter media. A particularly preferred microwave heater employs a 2400 MHz magnetron, similar to those found in microwaves for use in homes. Microwave heaters suitable for regenerating a 4 inch column of spent PMG media are available from the CHA Corporation of Laramie, Wyo. The CHA Corporation has developed a procedure to focus the microwaves into a helical configuration for heating a column of spent media. After the media passes through the microwave heated column, it is cooled and conveyed back to the canister by an air ejector (pneumatics). Filter canister 34a and filter canister 34b are configured to enable a sub-gradient to be removed from the filter canister, regenerated and returned.

FIGS. 5B and 5C provides details of a canister configured to enable PMG media to be removed and regenerated. In FIG. 5B, wherein filter media is regenerated in a batch process, a canister 46a includes sub-gradient layers 48a, 48b, and 48c. To enable a layer to be removed without disturbing the other layers, each layer is separated by a screen 50, having a mesh smaller than particle size of the PMG media in each sub-gradient. Screen 50 is preferably a metal screen, as plastics are generally not utilized in gas filtration systems. A pneumatic transfer system 52a can be selectively placed in fluid communication with any of sub-gradients layers 48a, 48b and 48c. Pneumatic transfer system 52a removes some portion of a selected sub-gradient layer and transfers that portion as a batch to microwave heater 54a. That batch of PMG media is heated to approximated 600° F. (or to some other temperature that has been empirically shown to regenerate the PMG media) for a period of time that has been empirically determined to enable regeneration to occur (the regeneration is based on heating the material until the adsorbed contaminants are released from the media). That batch is then transferred back to the appropriate sub gradient layer. FIG. 5C illustrates a substantially similar regeneration system that is based on a continuous cycle, rather than a batch cycle. Canister 46b includes both an inlet and an outlet port for each sub-gradient layer, and more fluid lines are required to couple pneumatic transfer system 52b to canister 46b and microwave heater 54b. The additional fluid lines enable PMG filter media to be removed from a sub-gradient layer as a continuous process, as opposed to a batch process.

FIG. 5D illustrates a continuously regenerating system based on a moving filter bed. A canister 58 includes a gas inlet disposed near the bottom of the canister, and a gas outlet near the top. Canister 58 includes a cone shaped bottom from which spent media is removed as required, and moved to a regenerator 60. Newly regenerated media is reintroduced into canister 58 at the top of the canister. The organic contaminants removed from the PMG media by heating the media can be vented to pollution control equipment (not separately shown), ambient atmosphere, or chilled/condensed and collected as liquids for recycle or disposal. In one embodiment canister 58 includes only a single sub-gradient and a plurality of different canisters are required to achieve the desired gradient. In such an embodiment, canister 58 does not need to be taken offline as media is regenerated, as removing some portion of the media does not change the removal characteristics of the canister. In another embodiment, canister 58 includes a plurality of sub-gradients (which are not separated by mesh layer, but rather stacked upon another with no physical interface). In such an embodiment, to maintain the desired removal characteristics the canister is taken offline until the entire contents of the canister have been removed, regenerated and returned (in the proper order) to the canister.

FIG. 6 schematically illustrates the components of a SAG/PMG system 70, based on system 30 of FIG. 3 but which additionally includes both a pre-treatment unit 72 and a post-treatment unit 74. Depending on the specific characteristics of the gas to be cleaned, several different types of pre-treatment may beneficially improve the SAG/PMG processes ability to remove contaminants. Some gas streams may include excess moisture, which can be removed by pre-treatment. Other gas streams may be at a temperature or pressure that is either too low, or too high, for optimal contaminant removal. Pre-treatment units configured to change the temperature or pressure of the incoming gas stream may enhance the removal process. The end use of the cleaned gas may require additional post-treatment processing. For example, the optimal gas pressure or temperature employed in removing the contaminants may not be suitable for downstream uses of the cleaned gas. Suitable post-treatment units configured to modify the temperature, pressure, or composition of the cleaned as can be added as required. Some gas streams may benefit from pre-treatment and not requirement post-treatment, whereas other gas streams may need no pre-treatment but may benefit from post-treatment.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of removing siloxanes from a gas stream, comprising the steps of:
   (a) providing a plurality of different grades of a carbon filter media, wherein each different grade is characterized as having a different average pore size;
   (b) analyzing the gas stream to determine the contaminants present in the gas stream;
   (c) for each different contaminant, selecting the grade of carbon filter media whose pore size will enable the preferential removal of that contaminant;
   (d) using the different grades of carbon filter media selected to produce a multi-layer filter bed; and
   (e) passing the gas stream through the multi-layer filter bed to remove the contaminants, the different layers minimizing removal competition among the contaminants, thereby enhancing the removal of the siloxanes from the gas stream.

2. The method of claim 1, wherein a plurality of the different grades of the carbon filter media are characterized such that at least 50% of the pores in that grade fall within a range that spans less than about 50 nm.

3. The method of claim 1, wherein a plurality of the different grades of the carbon filter media are characterized such that at least 50% of the pores in that grade fall within a range that spans less than about 10 nm.

4. The method of claim 1, wherein a plurality of the different grades of the carbon filter media are characterized such that at least 50% of the pores in that grade fall within a range that spans less than about 1 nm.

5. The method of claim 1, wherein the different grades of the carbon filter media are produced from anthracite.

6. The method of claim 1, wherein the step of selecting the grade of carbon filter media whose pore size will enable the preferential removal of a specific contaminant comprises the step of using a computer model that correlates the pore size of each grade of filter media to a specific contaminant.

7. The method of claim 6, wherein the computer model is based on both theoretical data and empirical data.

8. The method of claim 1, wherein the step of using the different grades of carbon filter media selected to produce a multi-layer filter bed comprises the step of configuring the multi-layer filter bed to achieve a segmented activity gradient.

9. The method of claim 1, wherein the step of using the different grades of carbon filter media selected to produce a multi-layer filter bed comprises the step of configuring the multi-layer filter bed such that the different grades of carbon filter media are arranged in a sequence, so that the gas stream to be filtered will pass through a carbon filter media having a largest average pore size first, and the gas stream to be filtered will pass through a carbon filter media having a smallest average pore size last.

10. The method of claim 1, wherein the step of using the multi-layer filter bed to remove the contaminants comprises the step of passing the gas stream through the multi-layer filter at a flow rate substantially lower than employed in conventional activated carbon filter beds.

11. The method of claim 1, wherein the step of using the multi-layer filter bed to remove the contaminants comprises the step of passing the gas stream through the multi-layer filter at a flow rate ranging from about 4 fpm to about 15 fpm.

12. The method of claim 1, further comprising the step of regenerating the carbon filter media using microwave energy.

13. A method of removing siloxanes and other contaminants from a gas stream, comprising the steps of:
 (a) providing a plurality of different grades of a carbon filter media, wherein each different grade is characterized as having a different average pore size;
 (b) analyzing the gas stream to determine the siloxanes and other contaminants present in the gas stream;
 (c) organizing the contaminants into different classes based on the molecular weight of the contaminants;
 (d) for each different class of contaminant, selecting the grade of carbon filter media whose pore size will enable the preferential removal of that class;
 (e) using the different grades of carbon filter media selected to produce a multi-layer filter bed; and
 (f) passing the gas stream through the multi-layer filter bed to remove the siloxanes and the other contaminants, different layers of the multi-layer filter bed minimizing removal competition among the different classes of contaminants, thereby enhancing the removal of the siloxanes from the gas stream.

14. The method of claim 13, wherein a plurality of the different grades of the carbon filter media are characterized such that at least 50% of the pores in that grade vary between plus or minus about 5 nm from an average value.

15. The method of claim 13, wherein a plurality of the different grades of the carbon filter media are characterized such that at least 50% of the pores in that grade vary between plus or minus about 0.5 nm from an average value.

16. The method of claim 13, wherein the step of using the different grades of carbon filter media selected to produce a multi-layer filter bed comprises the step of arranging the multi-layer filter bed to achieve a segmented activity gradient.

17. The method of claim 13, wherein the step of using the different grades of carbon filter media selected to produce a multi-layer filter bed comprises the step of arranging the multi-layer filter bed such that the different grades of carbon filter media are arranged in sequence, such that the gas stream to be filtered will pass through the carbon filter media having the largest average pore size first, and the gas stream to be filtered will pass through the carbon filter media having the smallest average pore size last.

18. A multi-layer filter bed for removing contaminants of different molecular weights from a gas stream, comprising:
 (a) a first layer of carbon filter media, wherein a majority of pores in the first layer of carbon filter media fall within a range that spans less than about 10 nm, and which preferentially remove contaminants having larger molecular weights; and
 (b) a second layer of carbon filter media, wherein a majority of pores in the second layer of carbon filter media fall within a range that spans less than about 1 nm, and which preferentially remove contaminants having smaller molecular weights.

19. The multi-layer filter bed of claim 18, further comprising an intermediate layer of carbon filter media disposed between the first and second layers of carbon filter media, wherein a majority of pores in the intermediate layer of carbon filter media fall within a range that spans less than about 10 nm, and which preferentially remove contaminants having intermediate molecular weights.

20. The multi-layer filter bed of claim 18, wherein the first and second layers of carbon filter media are made from anthracite coal.

21. A multi-layer filter bed for removing contaminants of different molecular weights from a gas stream, comprising:
 (a) a first layer of carbon filter media, wherein a majority of pores in the first layer of carbon filter media fall within a range that spans less than about 1 nm, and which preferentially remove contaminants having larger molecular weights; and
 (b) a second layer of carbon filter media, wherein a majority of pores in the second layer of carbon filter media fall within a range that spans less than about 1 nm, and which preferentially remove contaminants having smaller molecular weights.

22. The multi-layer filter bed of claim 21, further comprising an intermediate layer of carbon filter media disposed between the first and second layers of carbon filter media, wherein a majority of pores in the intermediate layer of carbon filter media fall within a range that spans less than about 1 nm, and which preferentially remove contaminants having intermediate molecular weights.

23. The multi-layer filter bed of claim 21, wherein the first and second layers of carbon filter media are made from anthracite coal, and the contaminants removed include siloxanes.

24. A system for removing contaminants of different molecular weights from a gas stream, comprising:
   (a) a multi-layer carbon filter bed for removing contaminants of different molecular weights from a gas stream, the multi-layer carbon filter bed comprising:
      (i) a first layer of carbon filter media, wherein a majority of pores in the first layer of carbon filter media fall within a range that spans less than about 10 nm, and which preferentially remove contaminants having larger molecular weights; and
      (ii) a second layer of carbon filter media, wherein a majority of pores in the second layer of carbon filter media fall within a range that spans less than about 1 nm, and which preferentially remove contaminants having smaller molecular weights; and
   (b) a microwave heater configured to regenerate the multi-layer carbon filter bed.

25. A system for removing contaminants of different molecular weights from a gas stream, comprising:
   (a) a multi-layer carbon filter bed for removing contaminants of different molecular weights from a gas stream, the multi-layer carbon filter bed comprising:
      (i) a first layer of carbon filter media, wherein a majority of pores in the first layer of carbon filter media fall within a range that spans less than about 1 nm, and which preferentially remove contaminants having larger molecular weights; and
      (ii) a second layer of carbon filter media, wherein a majority of pores in the second layer of carbon filter media fall within a range that spans less than about 1 nm, and which preferentially remove contaminants having smaller molecular weights; and
   (b) a microwave heater configured to regenerate the multi-layer carbon filter bed.

26. The system of claim 25, wherein the multi-layer carbon filter bed further comprises an intermediate layer of carbon filter media disposed between the first and second layers of carbon filter media, wherein a majority of pores in the intermediate layer of carbon filter media fall within a range that spans less than about 1 nm, and which preferentially remove contaminants having intermediate molecular weights.

27. The system of claim 24, wherein the first and second layers of carbon filter media are made from anthracite coal.

* * * * *

UNITED STATES PATENT AND TRADEMARK OFFICE
CERTIFICATE OF CORRECTION

PATENT NO. : 7,264,648 B1
APPLICATION NO. : 10/871920
DATED : September 4, 2007
INVENTOR(S) : Wetzel et al.

It is certified that error appears in the above-identified patent and that said Letters Patent is hereby corrected as shown below:

| | |
|---|---|
| FIGURE 1, Reference #16 | "BRAKTHROUGH" should read --BREAKTHROUGH-- |
| Column 2, line 36 | "of" should read --or-- |
| Column 3, line 49 | "represent" should read --represents-- |
| Column 4, line 56 | "pores" should read --pore-- |
| Column 5, line 49 | "Pores" should read --Pore-- |
| Column 7, line 9 | after "remove" delete "a" |
| Column 7, line 65 | after "used" (1st occurrence) insert --to-- |
| Column 8, line 5 | "pores" should read --pore-- |
| Column 8, line 7 | "pores" should read --pore-- |
| Column 8, line 8 | "pores" should read --pore-- |
| Column 8, line 29 | "includes" should read --include-- |
| Column 9, line 40 | after "compared" insert --to-- |
| Column 9, line 60 | "a" (2nd occurrence) should read --of-- |
| Column 11, line 51 | "pores" should read --pore-- |
| Column 11, line 52 | after "that" delete "is" (1st occurrence) |
| Column 11, line 52 | after "is" (2nd occurrence) insert --the-- |
| Column 13, line 46 | "related" should read --relate-- |
| Column 14, line 27 | "Pentatamethyldisiloxane" should read --Pentamethyldisiloxane-- |
| Column 16, line 9 | after "used" insert --as-- |

UNITED STATES PATENT AND TRADEMARK OFFICE
CERTIFICATE OF CORRECTION

PATENT NO. : 7,264,648 B1
APPLICATION NO. : 10/871920
DATED : September 4, 2007
INVENTOR(S) : Wetzel et al.

It is certified that error appears in the above-identified patent and that said Letters Patent is hereby corrected as shown below:

| | |
|---|---|
| Column 16, line 33 | "removal" should read --remove-- |
| Column 17, line 31 | "provides" should read --provide-- |
| Column 17, line 45 | "approximated" should read --approximately-- |
| Column 18, line 36 | "as" (1st occurrence) should read --gas-- |
| Column 18, line 38 | "requirement" should read --require-- |

Signed and Sealed this

Thirteenth Day of November, 2007

JON W. DUDAS
*Director of the United States Patent and Trademark Office*